United States Patent
Holopainen et al.

(10) Patent No.: US 12,151,371 B2
(45) Date of Patent: Nov. 26, 2024

(54) WASTE SORTING GANTRY ROBOT

(71) Applicant: MP ZenRobotics Oy, Vantaa (FI)

(72) Inventors: Harri Holopainen, Espoo (FI); Tuomas Lukka, Helsinki (FI)

(73) Assignee: MP ZenRobotics Oy, Vantaa (FI)

( * ) Notice: Subject to any disclaimer, the term of this patent is extended or adjusted under 35 U.S.C. 154(b) by 911 days.

(21) Appl. No.: 17/049,922

(22) PCT Filed: Apr. 18, 2019

(86) PCT No.: PCT/FI2019/050320
§ 371 (c)(1),
(2) Date: Oct. 22, 2020

(87) PCT Pub. No.: WO2019/207202
PCT Pub. Date: Oct. 31, 2019

(65) Prior Publication Data
US 2021/0237262 A1 Aug. 5, 2021

(30) Foreign Application Priority Data

Apr. 22, 2018 (SE) .................... 1830138-2

(51) Int. Cl.
*B25J 9/02* (2006.01)
*B07C 5/36* (2006.01)
(Continued)

(52) U.S. Cl.
CPC ............. *B25J 9/026* (2013.01); *B07C 5/36* (2013.01); *B25J 9/12* (2013.01); *B25J 9/144* (2013.01);
(Continued)

(58) Field of Classification Search
CPC ..... B25J 9/026; B25J 9/12; B25J 9/144; B25J 13/088; B25J 15/0625; B25J 17/0225;
(Continued)

(56) References Cited

U.S. PATENT DOCUMENTS

| 3,896,940 A | 7/1975 | Birrell |
| 4,305,130 A | 12/1981 | Kelley et al. |

(Continued)

FOREIGN PATENT DOCUMENTS

| CN | 1291537 | 4/2001 |
| CN | 1651295 | 8/2005 |

(Continued)

OTHER PUBLICATIONS

Machine Translation of DE 102015009998 A1; Griebel et al.; Suction Gripper for Objects With Smooth Surfaces and Associated Method and Use Thereof; Feb. 4, 2016 (Year: 2016).*

(Continued)

*Primary Examiner* — Elaine Gort
*Assistant Examiner* — Ellis B. Ramirez
(74) *Attorney, Agent, or Firm* — Knobbe, Martens, Olson & Bear, LLP

(57) ABSTRACT

A waste sorting manipulator can include a gripper assembly for interacting with one or more waste objects to be sorted within a working area. There is at least one servo for moving the gripper assembly between the manipulator and the working area. There is also at least one slidable coupling mounted between the at least one servo and the gripper assembly for allowing relative movement between the at least one servo and the gripper assembly.

23 Claims, 9 Drawing Sheets

(51) Int. Cl.
*B25J 9/12* (2006.01)
*B25J 9/14* (2006.01)
*B25J 13/08* (2006.01)
*B25J 15/06* (2006.01)
*B25J 17/02* (2006.01)

(52) U.S. Cl.
CPC ......... *B25J 13/088* (2013.01); *B25J 15/0625* (2013.01); *B25J 17/0225* (2013.01); *B07C 2501/0054* (2013.01); *B07C 2501/0063* (2013.01)

(58) Field of Classification Search
CPC ......... B25J 15/0616; B25J 15/02; B07C 5/36; B07C 2501/0054; B07C 5/342; B07C 2501/0063; B07C 5/00; Y10S 901/06
USPC ................. 700/258; 294/86.4, 86.16, 86.26; 901/46, 47
See application file for complete search history.

(56) References Cited

U.S. PATENT DOCUMENTS

| | | | |
|---|---|---|---|
| 4,616,121 A | 10/1986 | Clocksin | |
| 4,679,291 A | 7/1987 | Schmeal et al. | |
| 4,763,941 A | 8/1988 | Sniderman | |
| 4,835,730 A | 5/1989 | Shimano et al. | |
| 4,921,393 A | 5/1990 | Andeen et al. | |
| 4,998,442 A | 3/1991 | Brown et al. | |
| 5,116,190 A | 5/1992 | Silke | |
| 5,188,411 A | 2/1993 | Golden | |
| 5,244,242 A | 9/1993 | Goedecke et al. | |
| 5,299,693 A | 4/1994 | Ubaldi et al. | |
| 5,322,272 A * | 6/1994 | Benz | B65H 31/32 271/211 |
| 5,423,431 A | 6/1995 | Westin | |
| 5,445,247 A | 8/1995 | Sato | |
| 5,572,785 A | 11/1996 | Tveit | |
| 5,617,338 A | 4/1997 | Sugano | |
| 5,617,898 A | 4/1997 | Nagai | |
| 5,626,378 A | 5/1997 | Puhl et al. | |
| 5,636,966 A | 6/1997 | Lyon et al. | |
| 5,733,098 A | 3/1998 | Lyon et al. | |
| 5,735,782 A | 4/1998 | Berg | |
| 5,934,864 A | 8/1999 | Lyon et al. | |
| 5,987,726 A | 11/1999 | Akeel | |
| 5,992,691 A | 11/1999 | Post et al. | |
| 6,024,392 A | 2/2000 | Blatt | |
| 6,056,108 A | 5/2000 | Buchi et al. | |
| 6,168,220 B1 * | 1/2001 | Schmalz | B66C 1/0218 |
| 6,213,709 B1 | 4/2001 | Hebrank | |
| 6,256,553 B1 | 7/2001 | Erikkila | |
| 6,304,050 B1 | 10/2001 | Skaar et al. | |
| 6,331,758 B1 | 12/2001 | Takanashi et al. | |
| 6,817,639 B2 | 11/2004 | Schmalz et al. | |
| 6,967,465 B2 | 11/2005 | Takenaka et al. | |
| 7,327,112 B1 | 2/2008 | Hlynka et al. | |
| 7,415,321 B2 | 8/2008 | Okakaki et al. | |
| 7,650,203 B2 | 1/2010 | Maslov et al. | |
| 7,957,580 B2 | 6/2011 | Ban et al. | |
| 7,966,094 B2 | 6/2011 | Ban et al. | |
| 7,996,114 B2 | 8/2011 | Ban et al. | |
| 8,098,928 B2 | 1/2012 | Ban et al. | |
| 8,351,681 B2 * | 1/2013 | Koike | B25J 9/1679 382/141 |
| 8,380,342 B2 | 2/2013 | Ban et al. | |
| 8,606,398 B2 | 12/2013 | Eakins et al. | |
| 8,777,284 B2 | 7/2014 | Schaller et al. | |
| 8,880,217 B2 | 11/2014 | Izumi et al. | |
| 9,082,454 B2 | 7/2015 | Yao et al. | |
| 9,205,558 B1 | 12/2015 | Zevenbergen et al. | |
| 9,272,417 B2 | 3/2016 | Konolige et al. | |
| 9,230,329 B2 | 5/2016 | Lukka | |
| 9,486,926 B2 | 11/2016 | Kawano | |
| 9,600,798 B2 | 3/2017 | Battles et al. | |
| 9,713,875 B2 | 7/2017 | Lukka | |
| 9,789,517 B2 | 10/2017 | Doublet et al. | |
| 9,914,213 B2 | 3/2018 | Vijayanarasimhan et al. | |
| 10,449,572 B2 | 10/2019 | Ripley | |
| 10,464,105 B2 | 11/2019 | Koistinen et al. | |
| 10,482,120 B2 | 11/2019 | Ripley | |
| 10,576,630 B1 | 3/2020 | Diankov et al. | |
| 10,639,790 B1 | 5/2020 | Bacon et al. | |
| 11,660,762 B2 | 5/2023 | Holopainen et al. | |
| 2002/0190230 A1 | 12/2002 | Dworkowski | |
| 2002/0193909 A1 | 12/2002 | Parker et al. | |
| 2003/0012925 A1 | 1/2003 | Gorrell | |
| 2003/0133775 A1 | 7/2003 | Specher | |
| 2003/0145674 A1 | 8/2003 | Weaver | |
| 2004/0094979 A1 | 5/2004 | Damhuis | |
| 2005/0077856 A1 | 4/2005 | Takenaka et al. | |
| 2005/0173164 A1 | 8/2005 | Maslov et al. | |
| 2005/0218677 A1 | 10/2005 | Llich | |
| 2005/0279612 A1 * | 12/2005 | Boberg | B23Q 39/02 198/341.08 |
| 2006/0053624 A1 | 3/2006 | Maeda et al. | |
| 2007/0131213 A1 | 6/2007 | Matsuda | |
| 2007/0147678 A1 | 6/2007 | Gotting | |
| 2007/0187299 A1 | 8/2007 | Valerio | |
| 2007/0213874 A1 | 9/2007 | Oumi et al. | |
| 2007/0276539 A1 | 11/2007 | Habibi et al. | |
| 2007/0299559 A1 | 12/2007 | Jassen | |
| 2008/0150965 A1 | 6/2008 | Bischoff et al. | |
| 2008/0240511 A1 | 10/2008 | Ban et al. | |
| 2009/0025502 A1 | 1/2009 | Nakamoto | |
| 2010/0004778 A1 | 1/2010 | Arimatsu et al. | |
| 2011/0076128 A1 | 3/2011 | Johnson | |
| 2011/0231018 A1 | 9/2011 | Iwai et al. | |
| 2012/0032461 A1 | 2/2012 | Hukelmann | |
| 2012/0032491 A1 | 2/2012 | Hukelmann et al. | |
| 2013/0127192 A1 | 5/2013 | Regan et al. | |
| 2013/0127194 A1 | 5/2013 | Regan et al. | |
| 2014/0025197 A1 | 1/2014 | Mattern | |
| 2014/0036276 A1 * | 2/2014 | Gross | G01B 7/12 356/402 |
| 2014/0062112 A1 | 3/2014 | Ho-Young | |
| 2015/0016933 A1 | 1/2015 | Ochiishi | |
| 2015/0241203 A1 | 8/2015 | Jordil | |
| 2015/0328779 A1 | 11/2015 | Bowman et al. | |
| 2016/0332310 A1 | 11/2016 | Conall | |
| 2017/0028562 A1 | 2/2017 | Yamazaki et al. | |
| 2017/0073174 A1 | 3/2017 | Tanaka | |
| 2017/0174439 A1 | 6/2017 | Ripley | |
| 2017/0291308 A1 | 10/2017 | Junichi | |
| 2017/0355083 A1 | 12/2017 | Wigren | |
| 2018/0036774 A1 | 2/2018 | Lukka et al. | |
| 2018/0050451 A1 | 2/2018 | Takanishi et al. | |
| 2018/0127219 A1 | 5/2018 | Wagner et al. | |
| 2019/0030571 A1 | 1/2019 | Horowitz et al. | |
| 2019/0084012 A1 | 3/2019 | McCoy et al. | |
| 2019/0130560 A1 | 5/2019 | Horowitz et al. | |
| 2019/0217342 A1 | 7/2019 | Parr et al. | |
| 2019/0291283 A1 * | 9/2019 | Kurz | B25J 15/0616 |
| 2019/0361672 A1 | 11/2019 | Odhner et al. | |
| 2019/0389082 A1 | 12/2019 | Higo | |
| 2020/0048015 A1 | 2/2020 | Martin et al. | |
| 2020/0077074 A1 | 3/2020 | Denenberg et al. | |
| 2020/0087118 A1 | 3/2020 | Sato et al. | |
| 2020/0290214 A1 | 9/2020 | Watanabe et al. | |
| 2021/0061588 A1 | 3/2021 | Lukka et al. | |
| 2021/0237260 A1 | 8/2021 | Holopainen et al. | |
| 2023/0144252 A1 | 5/2023 | Lukka et al. | |
| 2023/0241787 A1 | 8/2023 | Holopainen et al. | |

FOREIGN PATENT DOCUMENTS

| | | |
|---|---|---|
| CN | 101088720 | 12/2007 |
| CN | 101471546 | 7/2009 |
| CN | 101618444 | 1/2010 |
| CN | 101508181 | 4/2011 |
| CN | 102431787 | 5/2012 |
| CN | 203212009 | 9/2013 |
| CN | 103787059 | 5/2014 |
| CN | 204057223 | 12/2014 |

(56) References Cited

FOREIGN PATENT DOCUMENTS

| | | | | |
|---|---|---|---|---|
| CN | 104513012 | 4/2015 | | |
| CN | 104589351 | 5/2015 | | |
| CN | 105196302 | 12/2015 | | |
| CN | 105215076 | 1/2016 | | |
| CN | 105372510 | 3/2016 | | |
| CN | 107363405 | 11/2017 | | |
| CN | 107650139 | 2/2018 | | |
| CN | 107738264 | 2/2018 | | |
| CN | 106362957 | 5/2018 | | |
| CN | 108032324 | 5/2018 | | |
| CN | 108971190 | 12/2018 | | |
| CN | 109013384 | 12/2018 | | |
| CN | 109176522 | 1/2019 | | |
| CN | 109249402 | 1/2019 | | |
| CN | 109433633 | 3/2019 | | |
| CN | 110116415 | 8/2019 | | |
| CN | 209866708 | 12/2019 | | |
| DE | 2455284 | 5/1976 | | |
| DE | 4127446 | A1 * | 2/1993 | B25J 9/026 |
| DE | 4440748 | A1 | 5/1996 | |
| DE | 10319253 | A1 | 12/2004 | |
| DE | 102010029662 | | 12/2011 | |
| DE | 102015009998 | A1 * | 2/2016 | B65G 47/91 |
| DE | 102015220413 | | 4/2017 | |
| DK | 3056289 | 1/2019 | | |
| EP | 0253229 | 1/1988 | | |
| EP | 0706838 | A1 | 4/1996 | |
| EP | 1466704 | 10/2004 | | |
| EP | 1810795 | 7/2007 | | |
| EP | 1918479 | 5/2008 | | |
| EP | 2476813 | 7/2012 | | |
| EP | 2585256 | 5/2013 | | |
| EP | 2694224 | 2/2014 | | |
| EP | 2758216 | 7/2014 | | |
| EP | 2810901 | 3/2016 | | |
| EP | 3056288 | 8/2016 | | |
| EP | 3056289 | 8/2016 | | |
| EP | 3236083 | 10/2017 | | |
| EP | 3254998 | 12/2017 | | |
| EP | 3496873 | 6/2019 | | |
| EP | 3626412 | 3/2020 | | |
| EP | 3658302 | 6/2020 | | |
| EP | 3672764 | 7/2020 | | |
| EP | 3674040 | 7/2020 | | |
| EP | 3677388 | 7/2020 | | |
| GB | 2325915 | 12/1998 | | |
| GB | 2325915 | A * | 12/1998 | B23Q 1/012 |
| GB | 2354752 | A | 4/2001 | |
| IN | 190628 | B | 8/2003 | |
| IT | MI20 081 360 | 1/2010 | | |
| JP | S5045304 | 4/1975 | | |
| JP | 61-249292 | 11/1986 | | |
| JP | H01 240287 | 9/1989 | | |
| JP | H03154793 | 7/1991 | | |
| JP | H04176583 | 6/1992 | | |
| JP | H0489687 | 8/1992 | | |
| JP | H05228780 | 9/1993 | | |
| JP | H05318369 | 12/1993 | | |
| JP | H0630857 | 4/1994 | | |
| JP | H0740273 | 2/1995 | | |
| JP | 05089337 | 12/1996 | | |
| JP | H092682 | 1/1997 | | |
| JP | 9131575 | 5/1997 | | |
| JP | H1069315 | 3/1998 | | |
| JP | 10-202571 | 8/1998 | | |
| JP | H11198076 | 7/1999 | | |
| JP | H11320461 | 11/1999 | | |
| JP | 201138280 | 5/2001 | | |
| JP | 2001138280 | 5/2001 | | |
| JP | 2002301683 | 10/2002 | | |
| JP | 2003031636 | 1/2003 | | |
| JP | 2003223642 | 8/2003 | | |
| JP | 2005117791 | 4/2005 | | |
| JP | 3684278 | B2 * | 8/2005 | |
| JP | 2007040273 | 2/2007 | | |
| JP | 2010089238 | 4/2010 | | |
| JP | 4947691 | 6/2012 | | |
| JP | 2012115916 | 6/2012 | | |
| JP | 2013252568 | 12/2013 | | |
| JP | 2014516810 | 4/2014 | | |
| JP | 5688924 | 3/2015 | | |
| JP | 2016068034 | 5/2016 | | |
| JP | 2016225336 | 12/2016 | | |
| JP | 2020022929 | 2/2020 | | |
| JP | 2020062633 | 4/2020 | | |
| KR | 20190050145 | 5/2019 | | |
| KR | 20190071387 | 6/2019 | | |
| SU | 1 399 116 | 5/1988 | | |
| WO | WO 89/08537 | 9/1989 | | |
| WO | WO 89/12019 | 12/1989 | | |
| WO | WO 9524544 A1 | 9/1995 | | |
| WO | WO 98/19799 | 5/1998 | | |
| WO | WO2008/102052 | 8/2008 | | |
| WO | WO2011/161304 | 12/2011 | | |
| WO | WO2012/052615 | 4/2012 | | |
| WO | WO2012/089928 | 7/2012 | | |
| WO | WO 2012/156579 | 11/2012 | | |
| WO | WO 2013/068115 | 5/2013 | | |
| WO | WO 2014/202998 | 12/2014 | | |
| WO | WO 2016/070412 | 5/2016 | | |
| WO | WO 19/056102 | 3/2019 | | |
| WO | WO 2019/207201 | 10/2019 | | |
| WO | WO 2019/207202 | 10/2019 | | |
| WO | WO 2019/215384 | 11/2019 | | |
| WO | WO 2020/053195 | 3/2020 | | |
| WO | WO2020/079125 | 4/2020 | | |
| WO | WO 2020/082176 | 4/2020 | | |

OTHER PUBLICATIONS

International Search Report and Written Opinion issued in PCT/FI2019/050320 dated Jul. 30, 2019.
Extended European Search Report issued in PCT/FI2019/050322 dated Mar. 29, 2022.
Extended European Search Report issued in PCT/FI2019/050322 dated Aug. 31, 2022.
International Search Report and Written Opinion issued in PCT/FI2021/050088 dated Mar. 5, 2021 in 11 pages.
International Search Report and Written Opinion of PCT/FI2019/050319, dated Jul. 29, 2019, in 17 pages.
International Search Report and Written Opinion of PCT/FI2019/050321, dated Jul. 30, 2019, in 13 pages.
International Search Report and Written Opinion issued in PCT/FI2019/050322 dated Aug. 28, 2019.
Boudaba et al., "Grasping of Planar Objects using Visual Perception", Article, p. 605-611.
Chinese Office Action, dated Apr. 3, 2015, in corresponding Chinese Patent Application No. 201280056743.X.
Cort, "Robotic parts feeding," Assembly, Jun. 2007, https://www.assemblymag.com/articles/86446-robotic-parts-feeding.
Finnish Search Report dated Jun. 19, 2012, corresponding to the Foreign Priority Application No. 20115923.
Fujimoto et al., Image-Based Visual Serving for Grasping Unknown Objects, Article, p. 876-881.
International Preliminary Report on Patentability issued in PCT/FI2021/050720 dated May 2, 2023.
International Preliminary Report on Patentability issued in PCT/FI2021/050722 dated May 2, 2023.
International Search Report issued in PCT/FI2012/050909 dated Mar. 4, 2013.
International Search Report issued in PCT/FI2021/050453 dated Sep. 2, 2021.
International Search Report issued in PCT/IF2021/050088 dated May 4, 2021.
International Search Report issued in PCT/FI2021/050720 dated Nov. 16, 2021.
International Search Report issued in PCT/FI2021/050722 dated Jan. 19, 2022.

(56) References Cited

OTHER PUBLICATIONS

Jang et al., "Visibility-based spatial reasoning for object manipulation in cluttered environments", Apr. 2008, pp. 42-438, vol. 40, Issue 4.
Japanese Office Action dated Aug. 25, 2015; Application No. 2013-546749.
Japanese Office Action dated Jul. 25, 2016; Application No. 2014-531283.
Kristensen et al., "Bin-picking with a solid state range camera", Jun. 30, 2001, pp. 143-151, vol. 35, Issues 3-4.
Morales et al., "Vision-based three-finger grasp synthesis constrained by hand geometry," Article, Jun. 30, 2006, p. 496-512, vol. 54, Issue 6.
Search Report received in Swedish Application No. 2030211-3 dated Feb. 4, 2021.
Office Action received in Swedish Application No. 2030325-1 dated Jun. 28, 2021.
Office Action received in Swedish Application No. 2030327-7 dated Jun. 29, 2021.
Wong et al., "Vision Strategies for Robotic Manipulation of Natural Objects," Article, Dec. 2-4, 2009, p. 8, New Zealand.
Yanagihara et al., "Parts-picking in Disordered Environment," Article, Nov. 3-5, 1991, p. 517-522, Japan.

\* cited by examiner

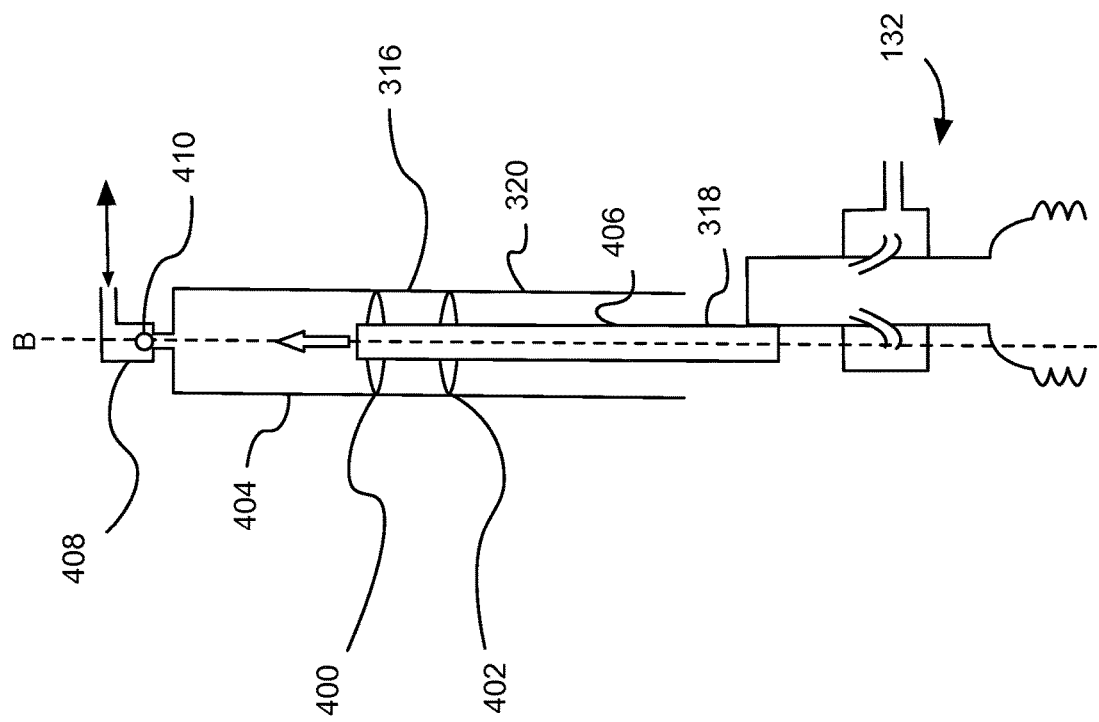

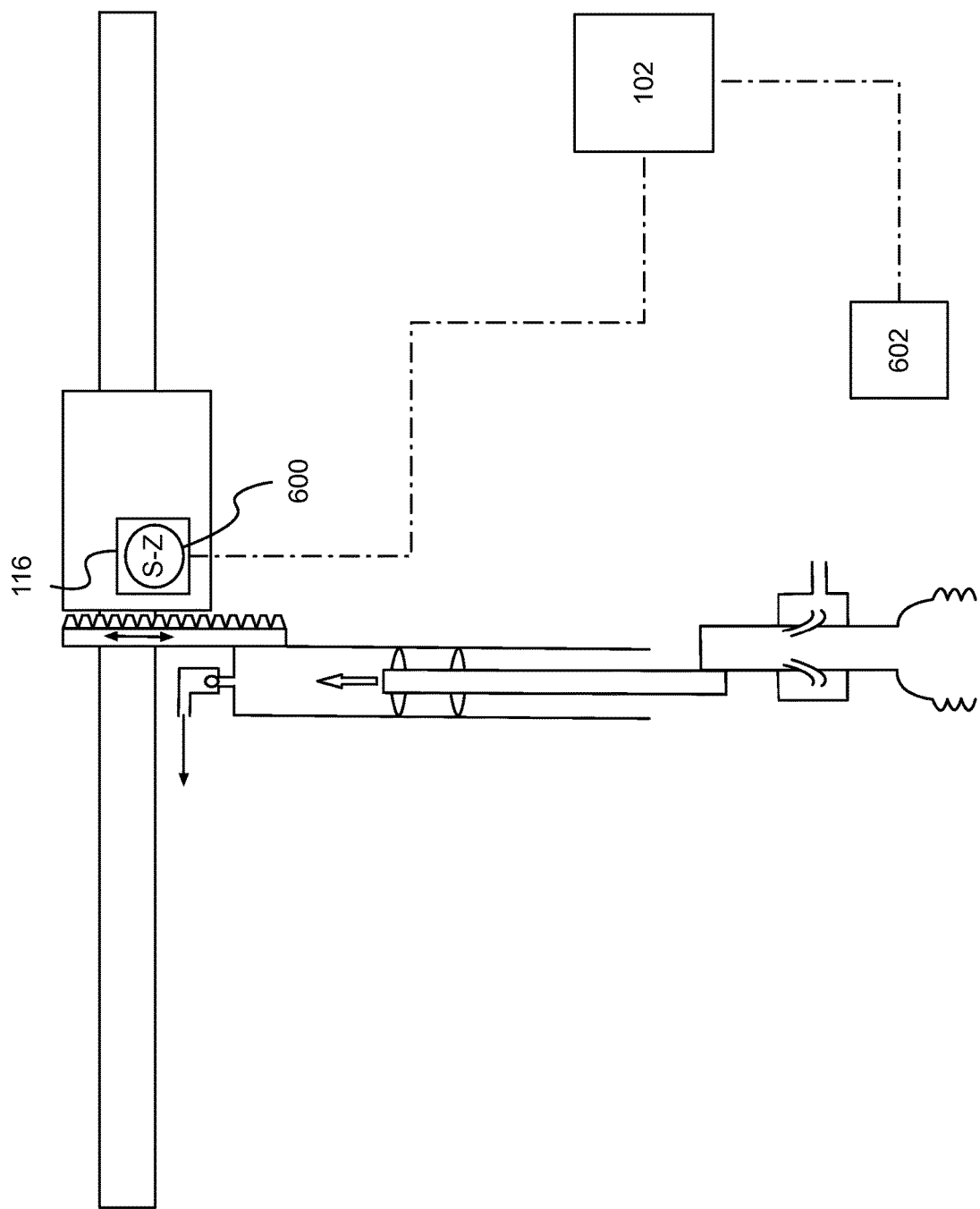

WASTE SORTING GANTRY ROBOT

TECHNICAL FIELD

The present invention relates to a waste sorting robot for sorting waste objects.

BACKGROUND

In the waste management industry, industrial and domestic waste is increasingly being sorted in order to recover and recycle useful components. Each type of waste, or "fraction" of waste can have a different use and value. If waste is not sorted, then it often ends up in landfill or incineration which has an undesirable environmental and economic impact.

Industrial waste may be passed to waste management centres because handling and disposing of waste is time consuming and requires specialist equipment. Accordingly, a waste management centre may sort waste to collect the most valuable and useful fractions. For example, industrial waste may include mixed wood and metal fractions (as well as other fractions) and sorted wood and metal fractions can be reused and sold to recyclers. Waste which is sorted into a substantially homogeneous fraction is more desirable and economical for recyclers. This is because less processing of the material is required before being recycled into new products and materials.

It is known to sort domestic and industrial waste in different ways. For many years waste has been manually sorted by hand on a conveyor belt. However hand sorting waste can be arduous and dangerous to the human sorter depending on the type of industrial or domestic waste being sorted. Furthermore, some waste sorting plants which use human sorters require multiple shifts in order to increase the output of sorted waste.

One approach for improving the safety and the output of waste sorting is to automate one or more aspects of the waste sorting. The automation can comprise a controller sending control and movement instructions to a manipulator for interacting with the physical objects. The combination of a controller sending control instructions to a manipulator can also be referred to as a "robot".

One such robotic waste sorting system is a "delta" robot suspended over a conveyor belt which moves objects to be sorted. The conveyor belt passes under the delta robot and within a working area of the delta robot. A working area of a robot is an area on a surface within which the robot is able to reach and manipulate an object. A working volume is the physical space within which the robot is able to move and manipulate an object. The working volume is determined by the height above the working area where the robot can manipulate an object. The working volume/area can also include chutes which are not part of the surface of a conveyor belt.

A delta robot comprises a servo housing and a plurality of arms which are connected to one or more servos for moving the arms. The arms extend down from the servo housing to a base which is coupled to a manipulator. The arms are connected via universal joints at the base.

Whilst a delta robot can be relatively effective at picking small light objects, the delta robot is not suitable for lifting heavy objects. Furthermore since the manipulator is suspended from the servo housing, the servos must have sufficient power to move the manipulator and the object. This means that the manipulators coupled to delta robots must be as light as possible to increase the maximum lift capacity of the delta robot.

Disadvantageously, the dimensions of the working volume for a delta robot varies across the width of the working space. In particular, the working volume is an inverted cone and becomes narrower as the manipulator moves away from the servo housing. In practice, this may mean that a delta robot cannot manipulate objects at the same height across the width of a conveyor belt and that delta robots are only suitable for working with narrow conveyor belts. This can be problematic because objects can be piled on each other making identifying and picking objects harder. This can limit the design choices and use applications when using a delta robot for waste sorting.

A delta robot is not particularly robust and the universal joints of a delta robot are particularly susceptible to wear and malfunction. Another consideration of a delta robot is that the movement of one or more arms causes movement in the other arms. Accordingly, whenever a delta robot moves, control instructions must be sent to each servo because each arm must move when the manipulator of the delta robot is moved. The non-linear control instructions to move the arms of the delta robot means that increased computational processing is required to control and move the delta robot within the working area/working volume.

Another known robot for automatic sorting of waste is a "gantry" robot. A gantry robot comprises a frame or gantry which engages the floor and bridges over a working area such as a conveyor belt. The gantry supports the weight of the manipulator and an object that the manipulator grips. The gantry robot comprises one or more axes of control which move in a straight line (e.g. linear). Normally the axes of control of a gantry robot are arranged at right angles to each other.

A gantry robot may pick objects from the conveyor belt and drop the picked objects into a chute. A chute comprises an opening which is in communication with a bin or another conveyor belt for receiving a particular fraction of waste. The picked objects placed in the bin or on the conveyor belt can then be moved to another location or step in waste processing. This means a picked object of a certain waste fraction is dropped into the corresponding chute. Known gantry robots have a four or more chutes located at the four corners of the rectangular working space for receiving the different fractions.

A problem with these automatic sorting robotic systems is that when a manipulator moves towards the conveyor in the Z-axis, the manipulator can exert an excessive force on the conveyor belt or an object to be sorted. This can crush the object making a successful pick less likely or can damage the conveyer belt or the manipulator.

SUMMARY

Embodiments of the present invention aim to address the aforementioned problems.

According to an aspect of the present invention there is a waste sorting manipulator comprising: a gripper assembly for interacting with one or more waste objects to be sorted within a working area; at least one servo for moving the gripper assembly with respect to the working area; and at least one slidable coupling mounted between the at least one servo and the gripper assembly for allowing relative movement between the at least one servo and the gripper assembly.

According to an aspect of the present invention there is waste sorting manipulator comprising: a gripper assembly for interacting with one or more waste objects to be sorted within a working area; at least one servo for moving the gripper assembly with respect to between the manipulator and the working area; and at least one slidable coupling mounted between the at least one servo and the gripper assembly for allowing relative movement between the at least one servo and the gripper assembly.

This means that the slidable coupling protects the manipulator and other parts of the waste sorting robot from being damaged if the manipulator descends rapidly downwards, for example, towards the conveyor belt.

Optionally the at least one servo is a servo configured to vary the height of the gripper assembly above the working area. Optionally the at least one servo moves the gripper assembly in a direction normal to the plane of the working area. Optionally, the gripper assembly slides relative to the at least one servo in a direction normal to the plane of the working area. This means that the slidable coupling protects the manipulator from colliding with the conveyor when the manipulator descends rapidly in the Z-axis.

Optionally the at least one slidable coupling compresses when the gripper assembly receives a force in a direction towards the at least one servo which is above a compression force threshold. Optionally the compression force threshold is very low and so the slidable coupling compress if the gripper assembly physically engages any object or other part of the waste sorting robot.

Optionally, the at least one slidable coupling extends when the gripper assembly receives a force in a direction away from the at least one servo which is above an extension force threshold. Optionally the compression force threshold is less than the extension force threshold. This means that the slidable coupling will compress more easily that it will extend. When the gripper assembly is being raised in the Z-axis, the slidable coupling will not extend before the gripper assembly is lifted. This avoids a sudden jerky movement when the slidable coupling fully extends.

Optionally the rate of compression of the at least one slidable coupling is greater than the rate of extension of the at least one slidable coupling. This means that the slidable coupling provides a dampening effect and the gripper assembly does not experience jerky movements irrespective of how the manipulator moves.

Optionally, the at least one slidable coupling comprises a first part coupled to the gripper assembly and a second part coupled to the at least one servo. Optionally there is a bearing mounted on either the first or second part. Optionally the bearing mounted on the first or second part slidably engages against the other of the first or second part. Optionally the first part and the second part are configured to slide relative to each other over a distance of 10 cm to 50 cm.

Optionally the first part is a rod and the second part is a hollow sleeve for receiving the rod. Optionally there is a seal between the first part and the second part. Optionally the at least one slidable coupling comprises a directional ball valve, wherein the ball valve is configured to allow air to escape from the hollow sleeve when the at least one slidable coupling is compressed. In this way, the slidable coupling is also a pneumatic dampener. The slidable coupling using the ball valve and selective control of the air entering and exiting the hollow sleeve controls the rate at which the slidable coupling extends and compresses.

Optionally the manipulator comprises at least one sensor for determining that the gripper assembly has engaged an object. Optionally the at least one sensor is configured to detect changes in acceleration, velocity or position of the gripper assembly. This means that the gripper assembly can be controlled to stop moving in the Z-axis when the gripper assembly engages an object or the conveyor belt. The slidable coupling slides over a distance that means the latency time for stopping the servo means that the slidable coupling does not fully compress before the servo has stopping moving the gripper assembly.

Optionally, an actuator is arranged to move the gripper assembly towards the working area and the actuator is coupled to the at least one slidable coupling. Optionally, the actuator is coupled between the at least one slidable coupling and the at least on servo. Optionally, the at least one slidable coupling comprises a portion of the actuator. Optionally, the actuator is a pneumatic actuator. Optionally, the actuator and the gripper assembly are substantially aligned along the same longitudinal axis.

In another aspect of the invention, a waste sorting robot comprises a frame; and a waste sorting manipulator according to any of the previous embodiments wherein the manipulator is moveably mounted on the frame and the manipulator is moveable within the working area.

Optionally the waste sorting robot is a waste sorting gantry robot and the frame is a gantry frame.

BRIEF DESCRIPTION OF THE DRAWINGS

Various other aspects and further embodiments are also described in the following detailed description and in the attached claims with reference to the accompanying drawings, in which:

FIG. 4 shows a schematic cross-sectional view of a gripper assembly;

FIG. 5b shows a cross-section view through the gripper assembly in the axis A-A in FIG. 5a;

FIG. 6 shows a schematic front view of the gripper assembly and manipulator;

DETAILED DESCRIPTION

Figure 1:
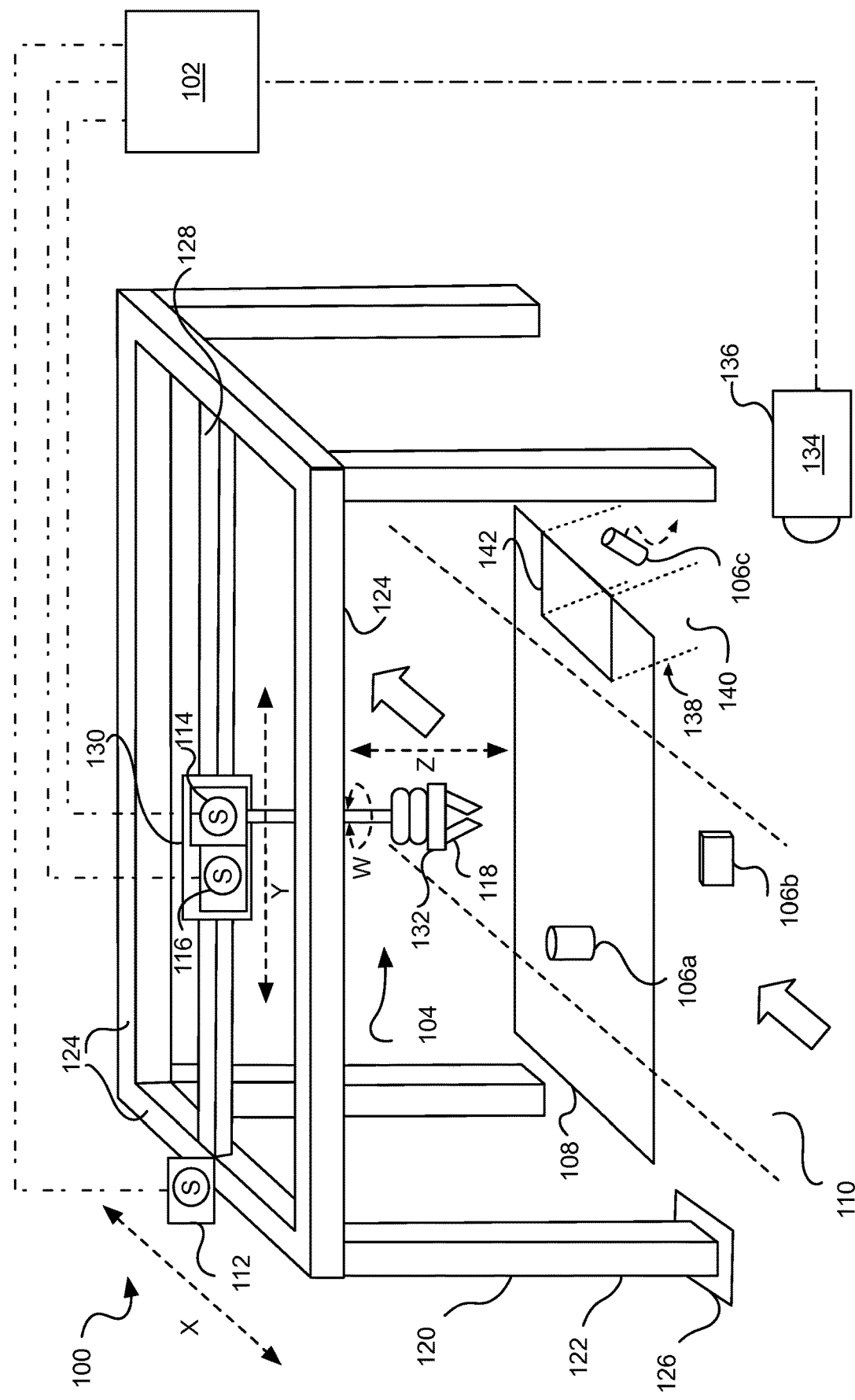
FIG. 1 shows a perspective schematic view of the waste sorting gantry robot.

FIG. 1 shows a schematic perspective view of a waste sorting robot 100. In some embodiments, the waste sorting robot 100 can be a waste sorting gantry robot 100. In other embodiments other types of waste sorting robots can be used. For the purposes of brevity, the embodiments will be described in reference to waste sorting gantry robots, but can also be other types of robot such as robot arms or delta robots.

In some embodiments, the waste sorting robot 100 is a Selective Compliance Assembly Robot Arm (SCARA). The waste sorting SCARA 100 may move in the X, Y, and Z planes like the waste sorting gantry robot, but incorporate movement in a theta axis at the end of the Z plane to rotate the end-of-arm tooling e.g. the gripper assembly 132. In some embodiments, the waste sorting robot 100 is a four axis SCARA robot 100 that consists of an inner link arm (not shown) that rotates about the Z-axis. The inner link arm is connected to an outer link arm (not shown) that rotates about a Z elbow joint (not shown). The Z elbow joint is connected to a wrist axis (not shown) that moves up and down and also rotates about Z. In some embodiments the waste sorting SCARA 100 comprises an alternative configuration which has the linear Z motion as the second axis.

For the purposes of brevity, the embodiments will be described in reference to waste sorting gantry robots 100, but any of the other aforementioned robot types can be used instead or in addition to the water sorting gantry robot 100.

In some embodiments, the waste sorting robot 100 is a Selective Compliance Assembly Robot Arm (SCARA). The waste sorting SCARA 100 may move in the X, Y, and Z planes like the waste sorting gantry robot, but incorporate movement in a theta axis at the end of the Z plane to rotate the end-of-arm tooling e.g. the gripper assembly 132. In some embodiments, the waste sorting robot 100 is a four axis SCARA robot 100 that consists of an inner link arm (not shown) that rotates about the Z-axis. The inner link arm is connected to an outer link arm (not shown) that rotates about a Z elbow joint (not shown). The Z elbow joint is connected to a wrist axis (not shown) that moves up and down and also rotates about Z. In some embodiments the waste sorting SCARA 100 comprises an alternative configuration which has the linear Z motion as the second axis.

For the purposes of brevity, the embodiments will be described in reference to waste sorting gantry robots 100, but any of the other aforementioned robot types can be used instead or in addition to the water sorting gantry robot 100.

The waste sorting gantry robot comprises a controller 102 for sending control and movement instructions to a manipulator 104 for interacting with the physical objects 106a, 106b, 106c. The combination of a controller sending control instructions to a manipulator can also be referred to as a "robot". The controller 102 is located remote from the manipulator 104 and is housed in a cabinet (not shown). In other embodiments, the controller 102 can be integral with the manipulator and/or a gantry frame 120.

The manipulator 104 physically engages and moves the objects 106a, 106b, 106c that enters the working area 108. The working area 108 of a manipulator 104 is an area within which the manipulator 104 is able to reach and interact with the object 106a 106b, 106c. The working area 108 as shown in FIG. 1 is projected onto the conveyor belt 110 for the purposes of clarity. The manipulator 104 is configured to move at variable heights above the working area 108. In this way, the manipulator 104 is configured to move within a working volume defined by the height above the working area 108 where the robot can manipulate an object. The manipulator 104 comprises one or more components for effecting relative movement with respect to the objects 106a, 106b, 106c. The manipulator 104 will be described in further detail below.

The physical objects 106a, 106b, 106c are moved into the working area 108 by a conveyor belt 110. The path of travel of the conveyor belt 110 intersects with the working area 108. This means that every object 106a, 106b, 106c that is moving on the conveyor belt 110 will pass through the working area 108. The conveyor belt 110 can be a continuous belt, or a conveyor belt formed from overlapping portions. The conveyor belt 110 can be a single belt or alternatively a plurality of adjacent moving belts.

In other embodiments, the physical objects 106a, 106b, 106c can be conveyed into the working area 108 via other conveying means. The conveyor can be any suitable means for moving the objects 106a, 106b, 106c into the working area 108. For example, the objects 106a, 106b, 106c are fed under gravity via slide (not shown) to the working area 108. In other embodiments, the objects can be entrained in a fluid flow, such as air or water, which passes through the working area 108.

The direction of the conveyor belt 110 is shown in FIG. 1 by two arrows. The objects 106a, and 106b are representative of different types of objects to be sorted having not yet been physically engaged by the manipulator 104. In contrast, the object 106c is an object that has been sorted into a particular type of object. In some embodiments, the manipulator 104 interacts with only some of the objects 106c. For example, the waste sorting gantry robot 100 is only removing a particular type of objects. In other scenarios, the manipulator 104 will interact and sort every object 106a, 106b, 106c which is on the conveyor belt 110.

In some embodiments, the objects to be sorted are waste products. The waste products can be any type of industrial, commercial, domestic, or any other waste which requires sorting and processing. Unsorted waste material comprises, for example, a plurality of fractions of different types of waste. Industrial waste can comprise fractions of metal, wood, plastic, hardcore and one or more other types of waste. In other embodiments, the waste can comprise any number of different fractions of waste formed from any type or parameter of waste. The fractions can be further subdivided into more refined categories. For example, metal can be separated into steel, iron, aluminium etc. Domestic waste also comprises different fractions of waste such as plastic, paper, cardboard, metal, glass and/or organic waste.

A fraction is a category of waste that the waste can be sorted into by the waste sorting gantry robot 100. A fraction can be a standard or homogenous composition of material, such as aluminium, but alternatively a fraction can be category of waste defined by a customer or user.

In some embodiments, the waste can be sorted according to any parameter. A non-limiting list of parameters for dividing unsorted waste into fractions is as follows: material, previous purpose, size, weight, colour, opacity, economic value, purity, combustibility, whether the objects are ferrous or any other variable associated with waste objects. In a further embodiment, a fraction can comprise one or more other fractions. For example, one fraction can comprise a paper fraction, a cardboard fraction, and a wood fraction to be combinable to be a combustible fraction. In other embodiments, a fraction can be defined based on the previous purpose of the waste object, for example plastic tubes used for silicone sealant. It may be desirable to separate out some waste objects because they are contaminated and cannot be recycled.

The objects are fed from a hopper or other stored source of objects onto the conveyor belt 110. Alternatively, the waste objects are fed from another conveyor belt (not shown) and there is no source of stored waste objects. In this case, the additional conveyor belt can be fed manually from e.g. an excavator. Optionally, the objects 106a, 106b, 106c can be pre-processed before being placed on the conveyor belt. For example, the objects can be washed, screened, crushed, ripped, shaken, vibrated to prepare the material before sorting. Alternatively, the waste objects 106a, 106b, 106c can be sorted with another robot or mechanical device. The objects 106a, 106b, 106c can be optionally pre-sorted before being placed on the conveyor belt 110. For example, ferrous material can be removed from the unsorted waste by passing a magnet in proximity to the conveyor belt 110. Large objects can be broken down into pieces of material which are of a suitable size and weight to be gripped by the manipulator 104.

The manipulator 104 is configured to move within the working volume. The manipulator 104 comprises one or more servos for moving the manipulator 104 in one or more axes. In some embodiments, the manipulator 104 is moveable along a plurality of axes. In some embodiments, the manipulator is moveable along three axes which are substantially at right angles to each other. In this way, the manipulator 104 is movable in an X-axis which is parallel with the longitudinal axis of the conveyor belt 110 ("beltwise"). Additionally, the manipulator 104 is movable across the conveyor belt 110 in a Y-axis which is perpendicular to the longitudinal axis of the conveyor belt 110 ("widthwise"). The manipulator 104 is movable in a Z-axis which is in a direction normal to the working area 108 and the conveyor belt 110 ("heightwise"). Optionally, the manipulator 104 can rotate about one or more axes. In some embodiments a gripper assembly 132 coupled to the manipulator 104 can rotate about a W-axis. The gripper assembly 132 is discussed in further detail below.

The directions of movement of the manipulator 104 within the working space along the X-axis, Y-axis and the Z-axis are shown by the two headed arrows with dotted lines. The manipulator 104 is moved with respect to the conveyor belt 110 by an X-axis servo 112, a Y-axis servo 114 and a Z-axis servo 116 respectively along the X-axis, the Y-axis and the Z-axis. The servos 112, 114, 116 are connectively connected to the controller 102 and controller 102 is configured to issue instructions for actuating one or more servos 112, 114, 116 to move the manipulator 104 within the working space. The connections between the servos 112, 114, 116 and the controller 102 are represented by dotted lines. Each connection between the servo 112, 114, 116 and the controller 102 can comprises one or more data and/or power connections.

Since the directions of movement of the manipulator 104 are substantially perpendicular to each other, movement of the manipulator in one of the axes is independent of the other axes. This means that the manipulator 104 movement can be defined in a cartesian coordinate frame of reference which makes processing movement instructions by the controller 102 simpler.

As mentioned previously, the manipulator 104 is mounted on a frame 120. In some embodiments, the frame 120 can be a gantry frame 120. In other embodiments, the frame 120 can be other structures suitable for supporting the manipulator 104 above the working area 108. For example, the frame 120 can be a structure for suspending the manipulator 104 above the working area with rods and/or cables. Hereinafter, the frame 120 will be referred to a gantry frame 120 but can be applicable to other frames for supporting a manipulator 104.

The gantry frame 120 comprises vertical struts 122 which engage with the floor or another substantially horizontal surface. In some embodiments, the vertical struts 122 can be tilted upright struts. In this way, the tilted upright struts are angled to the vertical. The tilted upright struts may be required to mount the gantry frame 120 to the floor in a non-standard installation. FIG. 1 shows the gantry frame 120 comprising four vertical struts 122 coupled together by horizontal beams 124. In other embodiments, the horizontal beams 124 can be tilted lateral beams 124. This may be required if the waste sorting gantry robot 100 is being installed in a small or unusual space. In other embodiments, there can be any suitable number of vertical struts 122. The beams 124 and struts 122 are fixed together with welds, bolts or other suitable fasteners. Whilst the horizontal beams 124 are shown in FIG. 1 to be located above the conveyor belt 110, one or more horizontal beams 124 can be positioned at different heights. For example, one or more horizontal beams 124 can be positioned underneath the conveyor belt. This can lower the centre of mass of the gantry frame 120 and make the entire waste sorting gantry robot 100 more stable if the vertical struts 122 are not secured to the floor.

The beams 124 and the struts 122 are load bearing and support the weight of the manipulator 104 and an object 106a, 106b, 106c that the manipulator 104 grasps. In some embodiments, the beams 124 and struts 122 are made from steel but other stiff, lightweight materials such as aluminium can be used. The vertical struts 122 can each comprise feet 126 comprising a plate through which bolts (not shown) can be threaded for securing the struts 122 to the floor. For the purposes of clarity, only one foot 126 is shown in FIG. 1, but each strut 122 can comprise a foot 126. In other embodiments, there are no feet 126 or fasteners for securing the gantry frame 120 to the floor. In this case, the gantry frame rests on the floor and the frictional forces between the gantry frame and the floor are sufficient to prevent the waste sorting gantry robot from moving with respect to the floor.

The manipulator 104 comprises at least one movable horizontal beam 128 which is movably mounted on the gantry frame 120. The moveable beam 128 can be mounted in a beam carriage (not shown). The moveable horizontal beam 128 is movably mounted on one or more of the other fixed horizontal beams 124 of the gantry frame 120. The moveable horizontal beam 128 is movable in the X-axis such that the manipulator 104 moves in the X-axis when the movable horizontal beam moves in the X-axis. The moveable horizontal beam 128 is mounted to the fixed horizontal beams 124 via an X-axis servo mechanism 112. In some embodiments, the servo 112 is coupled to the moveable horizontal beam 128 via a belt drive. In other embodiments, the servo is coupled to the moveable horizontal beam via a rack and pinion mechanism. In some embodiments, other mechanisms can be used to actuate movement of the moveable horizontal beam along the X-axis. For example, a hydraulic or pneumatic system can be used for moving the movable horizontal beam 128.

The X-axis servo 112 can be mounted on the moveable beam 128 or on the fixed horizontal beams 124. It is preferable for the X-axis servo to be mounted on the fixed horizontal beams 124 such that the X-axis servo does not have to exert force moving its own weight.

A manipulator carriage 130 is movably mounted on the moveable horizontal beam 128. The manipulator shuttle 130 is moveable along the longitudinal axis of the movable horizontal beam 128. In this way, the manipulator carriage 130 is movable in the Y-axis relative to the moveable beam 128. In some embodiments, the manipulator carriage 130 comprises a Y-axis servo mechanism 114 for moving the manipulator carriage 130 along the Y-axis. In other embodiments, the Y-axis servo 114 is not mounted in the manipulator carriage 130 and manipulator carriage 130 moves with respect to the Y-axis servo. In some embodiments, the servo 114 is coupled to the moveable horizontal beam 128 via a belt drive. In other embodiments, the servo 114 is coupled to the moveable horizontal beam 128 via a rack and pinion mechanism. In some embodiments, other mechanisms can be used to actuate movement of the moveable horizontal beam along the Y-axis. For example, a hydraulic or pneumatic system can be used for moving the manipulator carriage 130.

When the manipulator carriage 104 moves along the Y-axis, a gripper assembly 132 also moves in the Y-axis. The gripper assembly 132 is movably mounted to the manipulator carriage 130. The gripper assembly 132 is movable in the Z-axis in order to move the manipulator 104 heightwise in the Z-axis direction.

Figure 8:
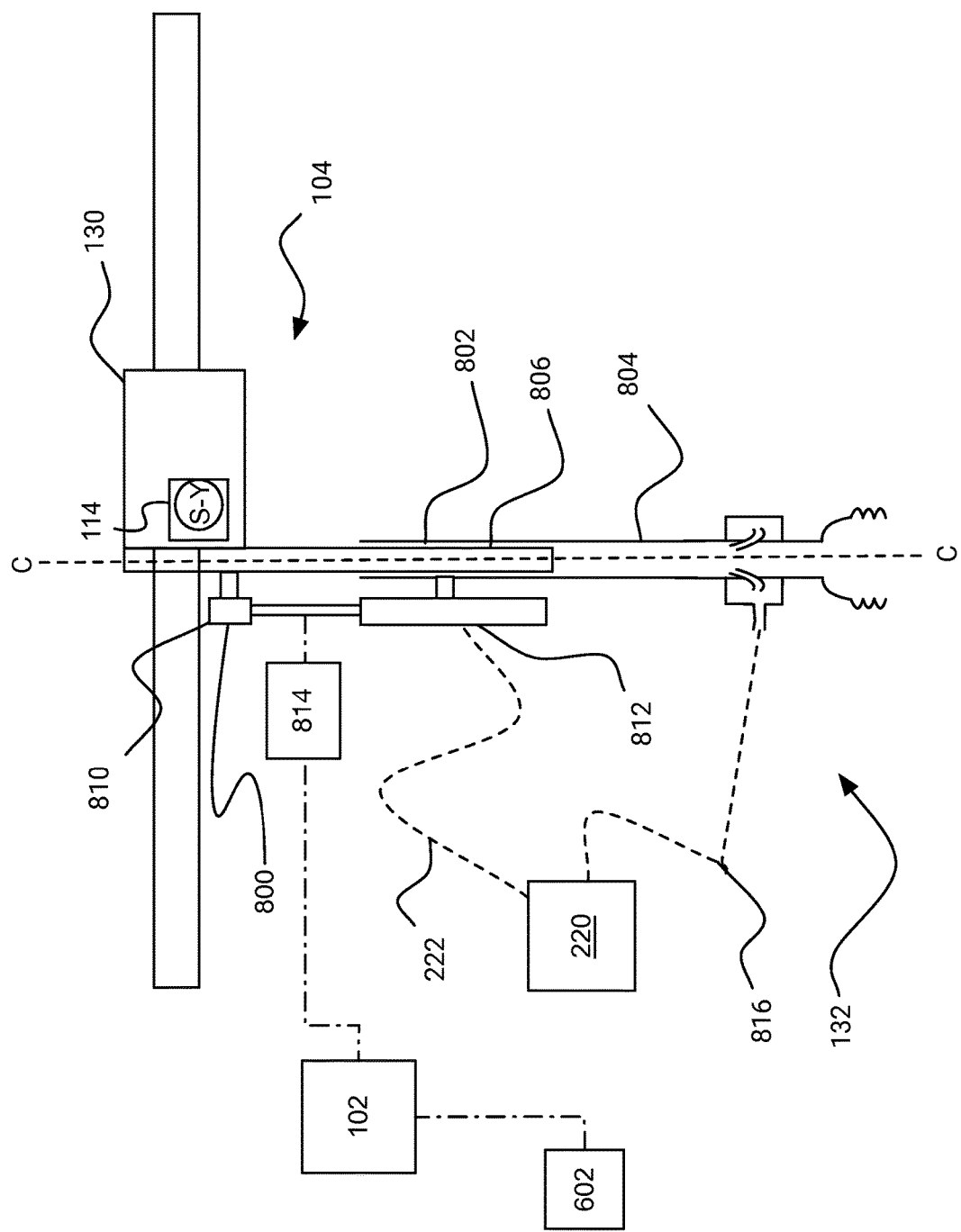
FIG. 8 shows a schematic front view of the gripper assembly and manipulator.
Figure 9:
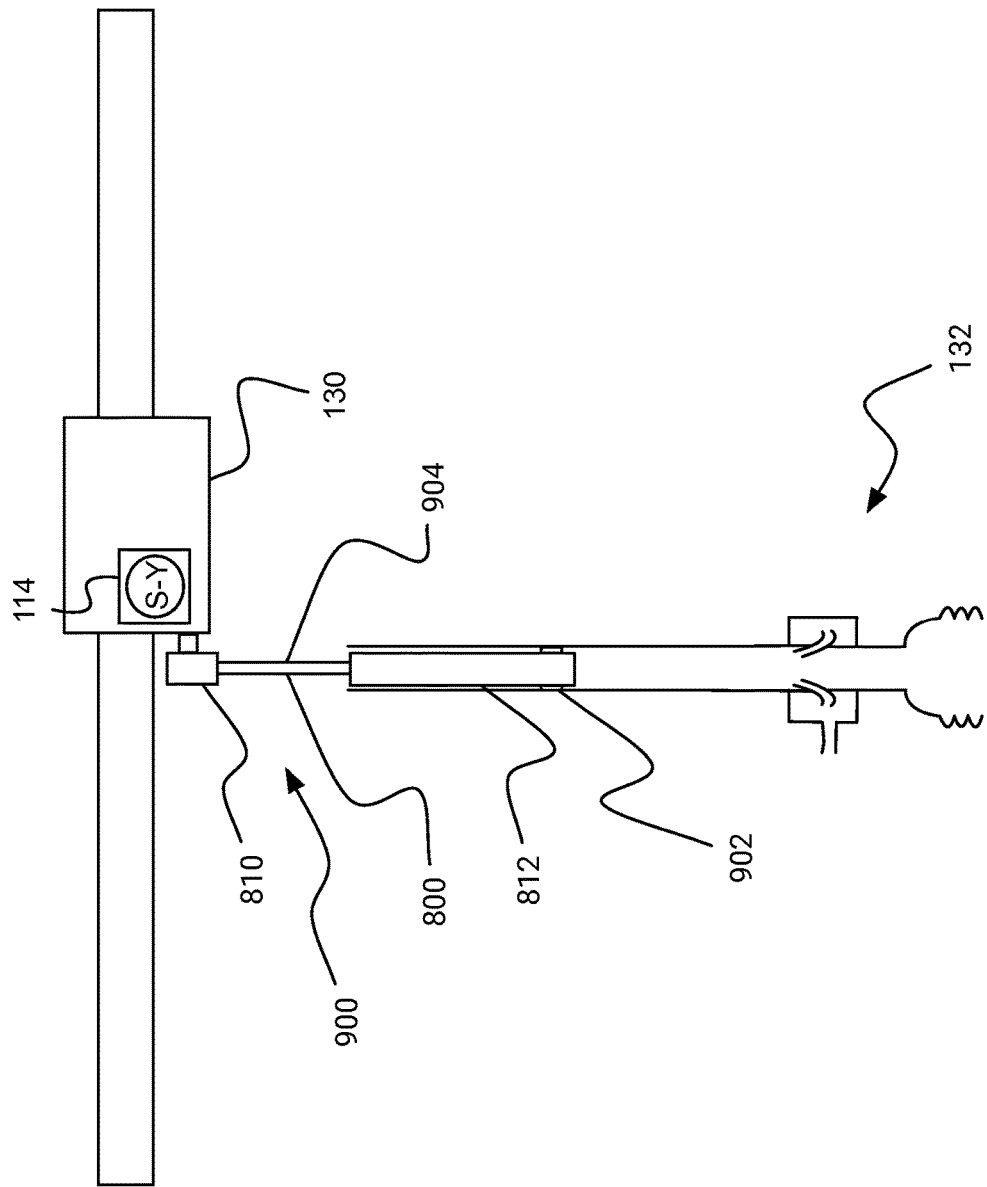
FIG. 9 shows a schematic front view of the gripper assembly and manipulator.

In some embodiments, the gripper assembly 132 optionally comprises a Z-axis servo mechanism 116 for moving the gripper assembly 132 along the Z-axis. In other embodiments, the Z-axis servo 114 is not mounted in the gripper assembly 132 but is mounted in the manipulator carriage 130. In this way, the gripper assembly 132 moves with respect to the Z-axis servo 116. In some embodiments, the servo 116 is coupled to the gripper assembly 132 via a belt drive. In other embodiments, the servo 116 is coupled to the gripper assembly 132 via a rack and pinion mechanism. In some embodiments, other mechanisms can be used to actuate movement of the moveable horizontal beam along the Z-axis. For example, a hydraulic or pneumatic system can be used for moving the gripper assembly 132 as shown in FIGS. 8 and 9 below.

As mentioned, the manipulator 104 as shown in FIG. 1 comprises a gripper assembly 132. In one embodiment, the gripper assembly 132 comprises a pair of jaws 118 configured to grip objects 106a, 106b, 106c. A gripper assembly 132 comprising a pair of jaws 118 is also known as a "finger gripper." The gripper jaws 118 are actuated with a servo (not shown) for opening and closing the jaws 118. The servo for the gripper jaws 118 is connectively coupled to the controller 102 so that the controller 102 can actuate the opening and closing of the jaws 118. In some embodiments, the gripper assembly 132 further comprises a rotation servo (not shown) to rotate the gripper assembly 132 and/or the gripper jaw 118 about the W-axis. In some embodiments the W-axis and the Z-axis are coaxial, but in other embodiments the W-axis and the Z-axis are offset This means that the gripper jaws 118 can be rotated to better grasp long thin objects across their narrow dimensions.

Figure 2:
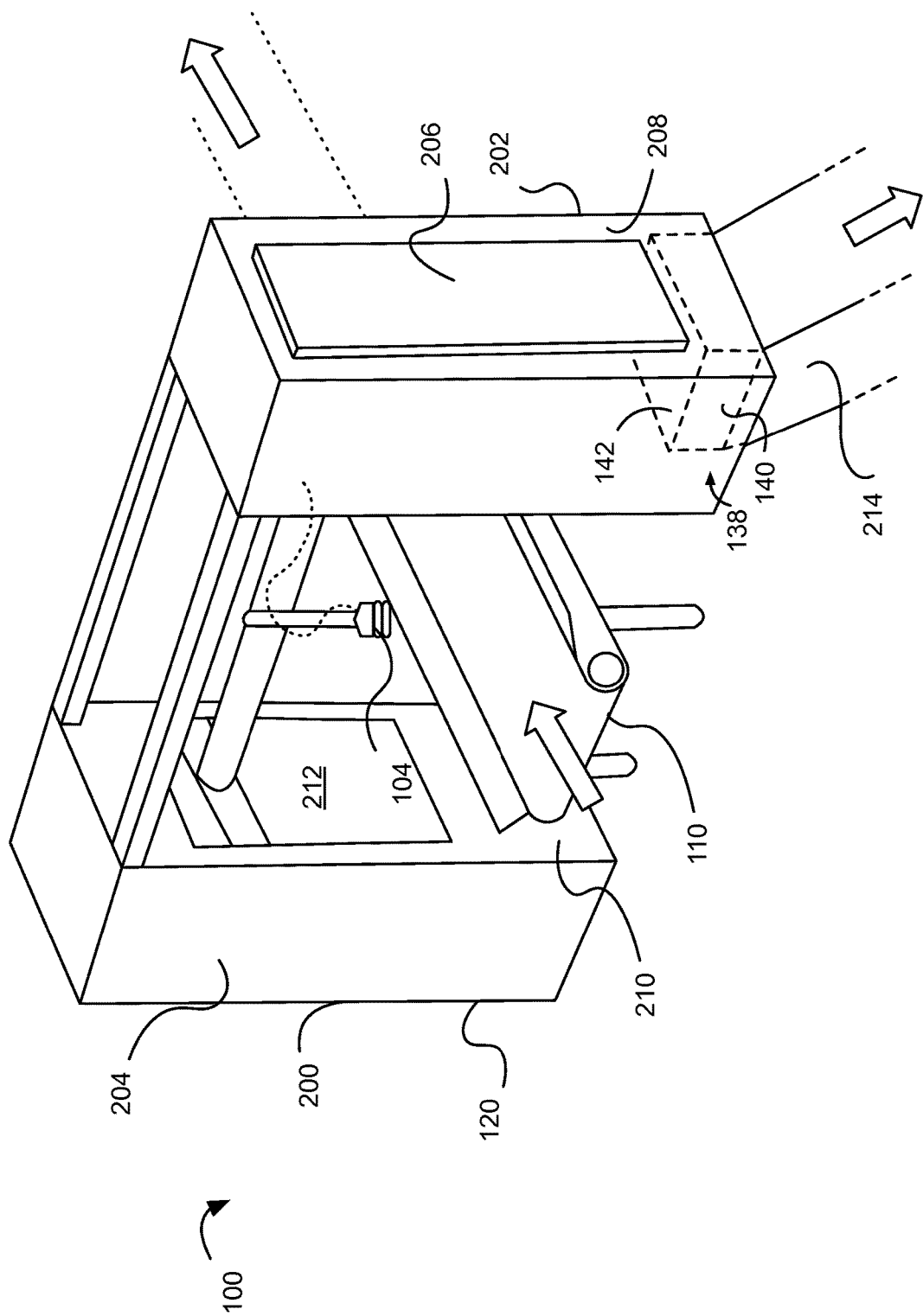
FIG. 2 shows another perspective schematic view of the waste sorting gantry robot.

Additionally or alternatively in a more preferable embodiment, the gripper assembly 132 can be a suction gripper (as shown in FIG. 2) for gripping the objects using negative pressure. The suction gripper can have a suction cup which is substantially symmetric about the Z-axis. This means that the suction gripper does not need to be rotated about the Z-axis to achieve an optimal orientation with respect to the objects 106a, 106b, 106c. This means that the gripper assembly rotation servo is not required with a suction gripper. In the case with an asymmetrical suction gripper 132, the gripper assembly 132 comprises a rotation servo to rotate the gripper assembly 132 about the W-axis as previously discussed above.

In other embodiments, the gripper assembly 132 of the manipulator 104 can be any suitable means for physically engaging and moving the objects 106a, 106b, 106c. Indeed, the manipulator 104 can be one or more tools for grasping, securing, gripping, cutting or skewering objects. In further embodiments the manipulator 104 can be a tool configured for interacting with and moving an object at a distance such as an electromagnet or a nozzle for blowing compressed air.

As mentioned, the controller 102 is configured to send instructions to the servos 112, 114, 116 of the manipulator 104 to control and interact with objects 106a, 106b, 106c on the conveyor belt 110. The controller 102 is connectively coupled to at least one sensor 134 for detecting the objects 106a, 106b, 106c on the conveyor belt 110. The at least one sensor 134 is positioned in front of the manipulator 104 so that detected measurements of the objects 106a, 106b, 106c are sent to the controller 104 before the objects 106a, 106b, 106c enter the working area 108. In some embodiments, the at least one sensor 134 can be one or more of a RGB camera, an infrared camera, a metal detector, a hall sensor, a temperature sensor, visual and/or infrared spectroscopic detector, 3D imaging sensor, terahertz imaging system, radioactivity sensor, and/or a laser. The at least one sensor 134 can be any sensor suitable for determining a parameter of the object 106a, 106b, 106c.

FIG. 1 shows that the at least one sensor 134 is positioned in one position. The at least one sensor 134 is mounted in a sensor housing 136 to protect the sensor 134. In other embodiments, a plurality of sensors are positions along and around the conveyor belt 110 to receive parameter data of the objects 106a, 106b, 106c.

The controller 102 receives information from the at least one sensor 134 corresponding to one or more objects 106a, 106b, 106c on the conveyor belt 110. The controller 102 determines instructions for moving the manipulator 104 based on the received information according to one or more criteria. Various information processing techniques can be adopted by the controller 102 for controlling the manipulator 104. Such information processing techniques are described in WO2012/089928, WO2012/052615, WO2011/161304, WO2008/102052 which are incorporated herein by reference.

Once the manipulator 104 has received instructions from the controller 102, the manipulator 104 executes the commands and moves the gripper assembly 132 to pick an object 106c from the conveyor belt 110. The process of selecting and manipulating an object on the conveyor belt 110 is known as a "pick".

Once a pick has been completed, the manipulator 104 drops or throws the object 106c into a chute 138. An object 106c dropped into the chute 138 is considered to be a successful pick. A successful pick is one where an object 106c was selected and moved to the chute 138 associated with the same fraction of waste as the object 106c.

The chute 138 comprises a chute opening 142 in the working area 108 for dropping picked objects 106c. The chute opening 142 of the chute 138 is adjacent to the conveyor belt 110 so that the manipulator 104 does not have to travel far when conveying a picked object 106c from the conveyor belt 110 to the chute opening 142. By positioning the chute opening 142 of the chute adjacent to the conveyor belt 110, the manipulator 104 can throw, drop, pull and/or push the object 106c into the chute 138.

The chute 138 comprises walls 140 defining a conduit for guiding picked objects 106c into a fraction receptacle (not shown) for receiving a sorted fraction of waste. In some embodiments, a fraction receptacle is not required at the sorted fractions of waste are piled up beneath the chute 138. FIG. 1 only shows one chute 138 associated with the manipulator 104. In other embodiments, there can be a plurality of chutes 138 and associated openings 142 located around the conveyor belt 110. Each opening 142 of the different chutes 138 is located within the working area 108 of the manipulator 104. The walls 140 of the conduit can be any shape, size or orientation to guide picked objects 106c to the fraction receptacle. In some embodiments, the successfully picked objects 106c move under the force of gravity from the chute opening 142 of the chute 138 to the fraction receptacle. In other embodiments, the chute 138 may guide the successfully picked objects 106c to another conveyor belt (not shown) or other means for moving the successfully picked objects 106c to the fraction receptacle.

Turning to FIG. 2, another embodiment will be discussed. FIG. 2 shows a schematic perspective view of a waste sorting gantry robot 100. The conveyor belt 110 is positioned between the gantry frame 120. For the purposes of clarity, no objects 106a, 106b, 106c have been shown on the conveyor belt 110.

The gantry frame 120 as shown in FIG. 2 comprises a different configuration and construction from that shown in FIG. 1. In particular, the gantry frame 120 comprises two cabinets 200, 202. The cabinet 200, 202 comprise internal struts and horizontal beams similar to those discussed in reference to the embodiments shown in FIG. 1. However the cabinet structures 200, 202 comprise sheet material 204 to cover the struts and the horizontal beams providing the walls, top and bottoms of the cabinets 200, 202.

The cabinets 200, 202 provide shielding for the delicate parts to the manipulator 104 such as the servos (not shown for clarity). This helps protect the manipulator from being damaged from stray waste objects. Furthermore the cabinet structures 200, 202, provide a barrier between the moving parts and the human operator. This means that the human operator cannot accidentally stray into the working area 108 of the waste sorting gantry robot. The gantry frame 120 comprises at least one enclosure 200, 202. The enclosure 200, 202 surrounds at least a part of the gantry frame 120. In some embodiments, there can be a plurality of enclosures 200, 202, each surrounding one or more parts of the waste sorting gantry robot 100. The enclosure 200, 202 can be a solid sheet material or can be perforated so that one or more internal parts of the waste sorting gantry robot 100 are visible. The enclosure 202, 204 for example, surrounds the chute 138 on three sides. The enclosure 200, 202 also surrounds at least a portion of the manipulator 104. In other embodiments, the enclosure 200, 202 can completely surround and enclose the waste sorting gantry robot 100. In this case, the enclosure 200, 202 comprises openings for the waste sorting objects 106a, 106b, 106c to be conveyed into the working area 108.

Figure 3:
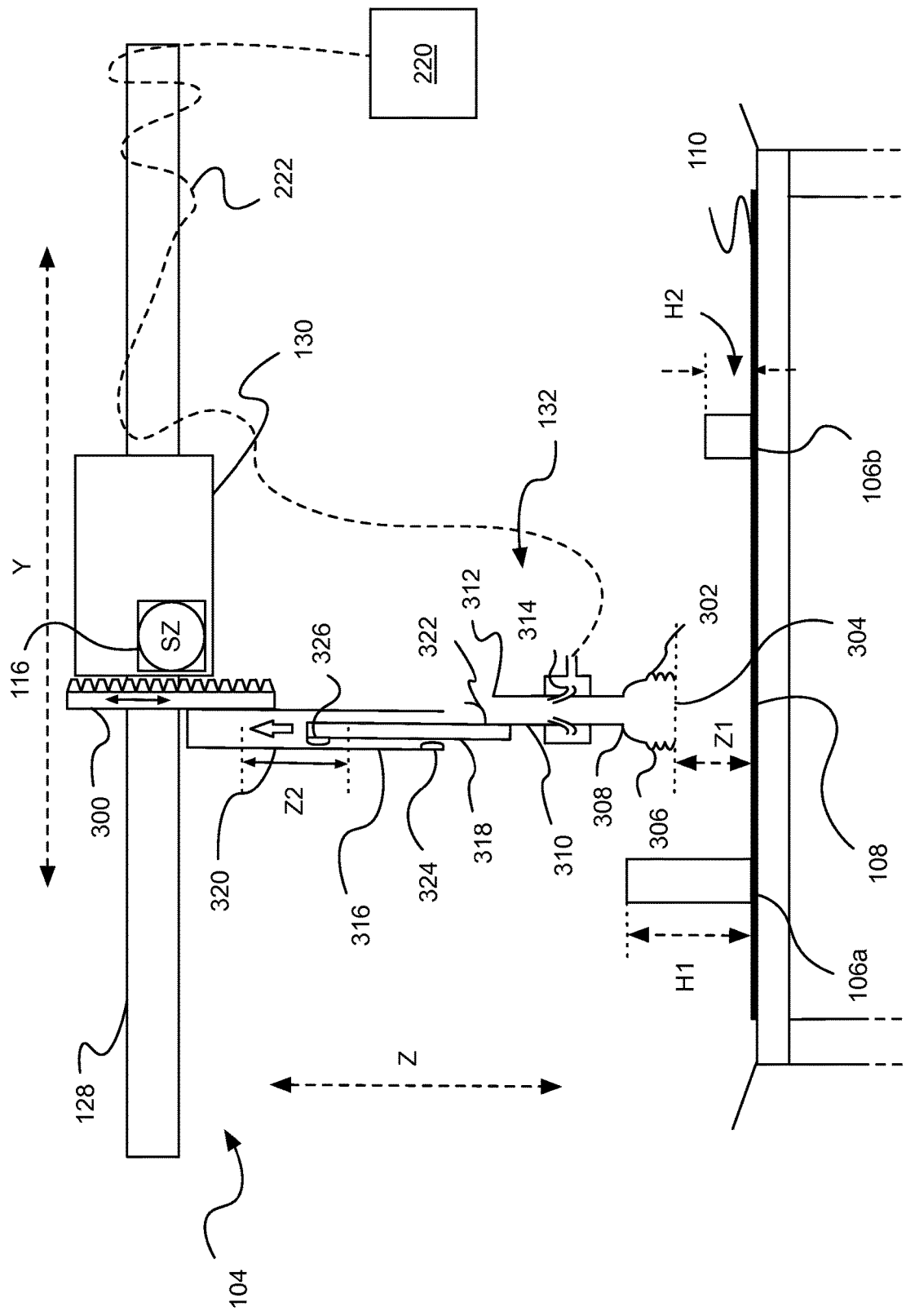
FIG. 3 shows a schematic cross-sectional front view of the waste sorting gantry robot.

The manipulator 104 will now be discussed in more detail with respect to FIG. 3. FIG. 3 shows a cross-sectional front view of the waste sorting robot 100. FIG. 3 shows a close up of the manipulator 104 with the manipulator carriage 130 mounted on the moveable horizontal beam 128. As mentioned previously, the manipulator carriage 130 is movable along the movable horizontal beam 128 to move the gripper assembly 132 across the conveyor belt 110 in the Y-axis.

The manipulator carriage 130 comprises the Z-axis servo 116 for moving the gripper assembly 132 in the Z-axis. The Z-axis servo 116 varies the height of the gripper assembly 132 above the conveyor belt 110 and the working area 108. The Z-axis servo is coupled to a pinon (not shown) that engages with a rack 300 for moving the gripper assembly in the Z-axis. In some embodiments, the Z-axis servo can be coupled to other mechanisms for raising and lowering the gripper assembly 132. For example the Z-axis servo can be coupled to a cable mechanism for moving the gripper assembly 132 up and down. An arrow on the rack 300 shows the direction that the gripper assembly 132 moves with respect to the Z-axis servo and the manipulator carriage 130 when the Z-axis servo is actuated.

The gripper assembly 132 moves in the Z-axis in order to accommodate different height objects 106a, 106b on the conveyor belt 110. For example, a first object 106a to be sorted has a height H1 whereas a second object 106b to be sorted has a height H2. H1 is greater than H2 and so the gripper assembly 132 must move closer to the conveyor belt 110 and the working area 108 in the Z-axis for the second object 106b than the first object 106a.

In some embodiments, the gripper assembly 132 when fully extended along the Z-axis can physically engage the surface of the conveyor belt 110. This means that the gripper assembly 132 can pick up objects which are flat or have a very low profile in the Z-axis. The arrangement in FIG. 3 shows that the gripper assembly 132 is able to travel a distance Z1 in the Z-axis downwards to the conveyor belt 110. The maximum distance that the gripper assembly 132 can travel in the Z-axis due to the Z-axis servo 116 is between 50 cm to 100 cm. In some embodiments, the gripper assembly 132 can travel in the Z-axis 40 cm. In other embodiments the gripper assembly 132 can move any distance in the Z-axis, provided that the gantry frame 120 is configured accordingly.

The gripper assembly 132 as shown in FIG. 3 is a suction gripper 132. The suction gripper 132 is in fluid communication with a pneumatic system 220 schematically represented in FIG. 3. The pneumatic system 220 comprises at least one hose 222 for connecting the suction gripper 132 to the pneumatic system 220. The pneumatic system 220 can be wholly or partially housed in the gantry frame 120 or alternatively remote from the gantry frame 120. In some embodiments, the hose is an air hose 222 for providing a source of air to the suction gripper 132.

The suction gripper 132 comprises a suction cup 302 having a side wall and a top wall and a suction mouth 304. The suction mouth 304 of the suction cup 302 is arranged to engage with an object to be sorted 106a, 106b. The suction cup 302 comprises a hollow construction and a generally circular cross-section (across the Z-axis). In other embodiments, the suction cup 302 is elongate across the Z-axis and has a rectangular or oval cross-sectional shape.

As mentioned in some embodiments, the suction cup 302 can be elongate and/or asymmetrical about one or more axes. In this case, the gripper assembly 132 comprises a rotation servo to rotate the gripper assembly 132 about the W-axis as previously discussed in reference to FIG. 1.

In some embodiments, the side wall of the suction cup 302 comprises a ribbed or concertinaed wall portion 306. The ribbed wall portion 306 creates a resiliently flexible portion in the suction cup 302 such that the suction cup 302 preferentially compresses in the Z-axis. In this way, when the suction cup 302 descends in the direction of the Z-axis and engages the object 106a, 106b, the ribbed wall portion 306 helps absorb a force of the impact which protects the manipulator 104.

The suction cup 302 is made from a resiliently deformable material such as silicon, rubber or other similar material. This means that the suction cup 302 can deform when the suction cup abuts an irregular shape. Accordingly, the suction cup 302 can make a better seal between a lip of the side wall and the object 106a, 106b to be picked.

The suction cup 302 is in fluid communication with a first air inlet 308 of a suction tube 310 for evacuating air from the space within the suction cup 302. The suction tube 310 comprises an elongate side wall. The suction tube 310 comprises the first air inlet 308 at one end and an air outlet 312 at another end. The negative pressure for the suction gripper 132 is generated near the suction cup 302 of the suction gripper 132, which avoids the need for a vacuum hose. The suction tube 310 comprises a second air inlet 314 which is in fluid communication with the air hose 222.

Accordingly, the second air inlet 314 introduces an air source into the suction tube 310 between the first air inlet 308 and the air outlet 312.

The gripper assembly 132 is mounted to the Z-axis servo via a slidable coupling 316. In some embodiments, the gripper assembly is mounted to the Z-axis servo via a plurality of slidable couplings 316. Indeed, other embodiments, there can be any number of slidable couplings 316 between the gripper assembly 132 and the Z-axis servo 116. The slidable coupling comprises a first part 318 coupled to the gripper assembly 132 and a second part 320 which is coupled to the Z-axis servo 316. The first part 318 is fastened to the suction tube 310 of the gripper assembly 132. In other embodiments, the first part 318 is fastened to any other component of the gripper assembly 132. The second part 320 is fastened to the rack 300 of the Z-axis servo 116. In some embodiments, the first and second parts are bolted, glued, welded, screwed respectively to the gripper assembly 132 and the rack 300 of the Z-axis servo 116 mechanism.

The first and second parts 318, 320 of the slidable coupling 316 are arranged to slide with respect to each other. The relative movement of the first part 318 and the second part 320 is in a direction which is normal to the plane of the conveyor belt and/or the working area 108. In other words, the first part 318 and the second part 320 move relative to each other in the Z-axis. The first and second parts 318, 320 are elongate and each have longitudinal axis which are aligned along a longitudinal axis B-B (shown in FIG. 4). In some embodiments the first and second parts 318, 320 are parallel with the Z-axis. In some other embodiments, the first part 318 and the second part 320 are not parallel with the Z-axis, but tilted with respect to the Z-axis. In this case, when the first and second parts 318, 320 slide relative to each other, a component of the movement is in the Z-axis.

The first and second parts 318, 320 can slide relative to each other over a distance Z2 along the Z-axis. In some embodiments, Z2 is 10 cm to the full extent of the Z-axis travel, e.g. 40 cm. Preferably the first and second parts 318, 320 slide relative to each other by 30 cm, e.g. Z2=30 cm. For domestic waste, most of the objects 106a, 106b to be sorted will only project up from the conveyor belt 110 approximately 30 cm. Some objects to be sorted 106a, 106b may have a dimension longer than 30 cm, however long thin objects will tend to topple over and lie flat on the conveyor belt 110.

In some embodiments, the first part 318 is a rod and the second part 320 is a hollow sleeve for receiving the rod 318. In some embodiments the hollow sleeve 320 and the rod 318 are aluminium extrusions, although the hollow sleeve 320 and the rod 318 can be made from any other suitable material such as steel. The slidable coupling 316 can be any suitable mechanism to let the gripper assembly 132 to move with respect to the Z-axis servo 116. For example, the first part 318 can be a hollow sleeve and the second part 320 can be a rod. In other embodiments, both the first and second parts 318, 320 can both be elongate elements, for example, rods which are slidably coupled to each other. The rods (not shown) can be arranged side by side and slide against their respective exterior surfaces. In other embodiments, the slidable coupling 316 can be a "lazy tongs" scissor mechanism.

The compression of the first part 318 with respect to the second 320 is limited by a catch 322. The catch 322 is mounted part way down the side of the first part 318 and engages with a lip of the sleeve 320 of the second part. Additionally or alternatively the compression of the first 318 part with respect to the second part 320 is limited in the Z-axis by the rod 318 physically engaging the end of the hollow sleeve 320.

In contrast, extension of the first part 318 with respect to the second part 320 is limited by a sleeve stop 324. The sleeve stop 324 is mounted on the inside of the hollow sleeve 320 and engages with a reciprocal rod stop 326. The sleeve stop 324 and the rod stop prevent the first and second parts 318, 320 from being detached from each other when the slidable coupling 316 is fully extended.

In operation, the Z-axis servo 116 lowers the gripper assembly 132 towards an object 106a, 106b, to be picked. As the gripper assembly 132 engages the surface of the object 106a, the first part 318 and the second part 320 of the slidable coupling 316 move with respect to each other. This means that if the Z-axis servo 116 continues to lower the gripper assembly 132 before the controller 102 stops the Z-axis servo 116, the gripper assembly 132 is not forced into the object 106a, 106b to be picked or the conveyor belt 110. In this way, the slidable coupling 316 is a shock absorber that protects the manipulator 104 from collision with conveyor belt 110 or objects 106a, 106b. This prevents damage to the manipulator 104 and/or the conveyor belt 110. Furthermore, since the slidable coupling 316 slides, the objects 106a, 106b to be picked are not crushed and this increases the likelihood that the suction gripper 132 makes a successful pick.

Figure 7:
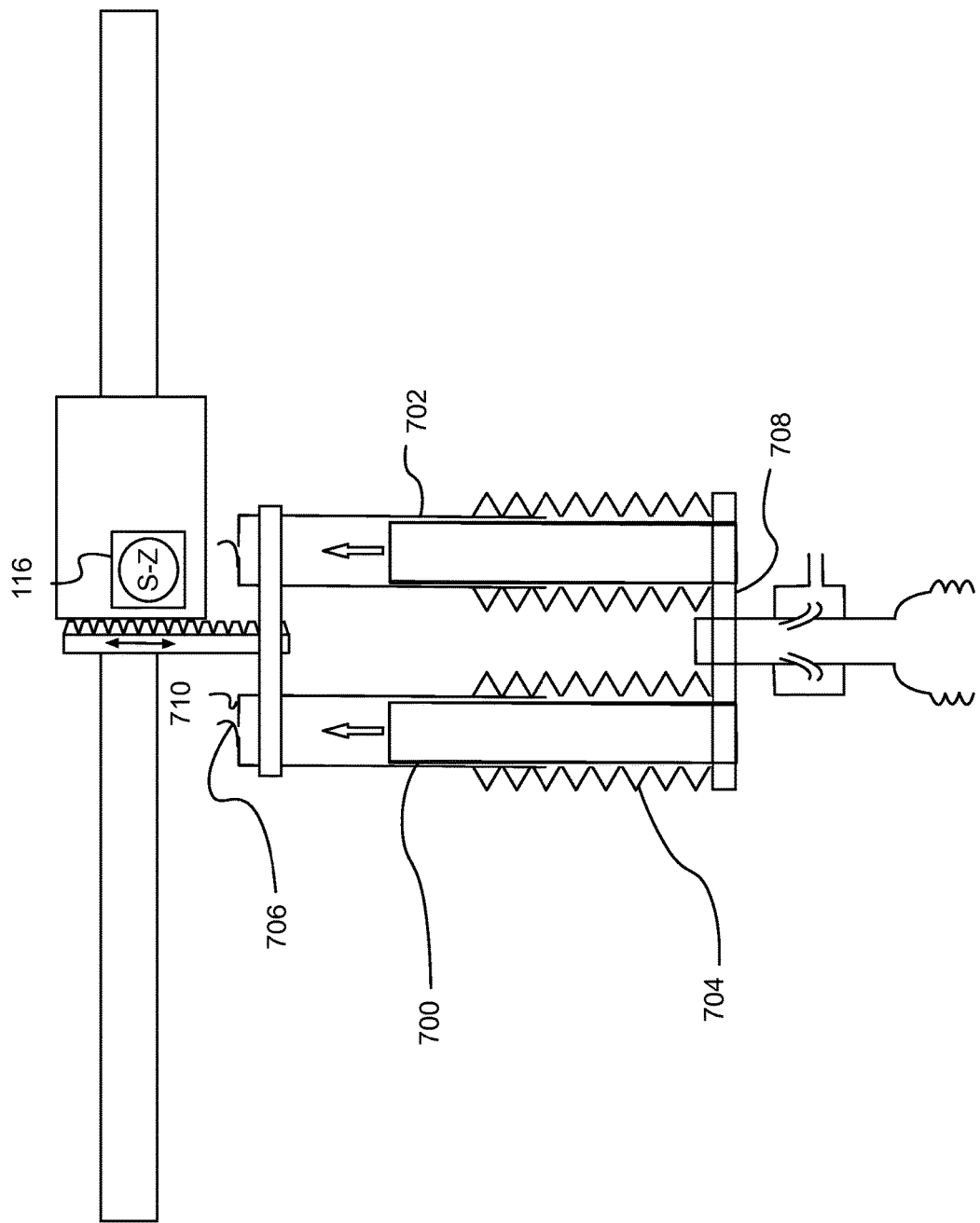
FIG. 7 shows a schematic front view of the gripper assembly and manipulator.

In some embodiments, the slidable coupling 316 comprises a rubber protective sleeve 704 (as shown in FIG. 7) which covers the slidable coupling 316. In this way the rubber protective sleeve prevents dust and other debris damaging the slidable coupling mechanism 316. Furthermore, the rubber protective sleeve helps absorb collision energy.

Turning to FIG. 4, another embodiment will now be described. The arrangement as shown in FIG. 4 is substantially the same as the embodiments described in reference to FIG. 3. However a difference is that the first part 318 and the second part 320 of the slidable coupling 316 are coupled together differently. The elements which are the same as previously discussed embodiments will have the same reference number.

The rod 318 of the first part comprises a first seal 400 and optionally a second seal 402. The first and second seals 400, 402 engage both the exterior surface 406 of the rod 318 and an interior surface 404 of the hollow sleeve 320. The seals 400, 402 are fixed to the exterior surface 406 of the rod 318 and the seals 400, 402 slide along the interior surface 404 of the hollow sleeve 320. Alternatively the seals 400, 402 are fixed to the interior surface 404 of the hollow sleeve 320 and slide with respect to the exterior surface 406 of the rod 318. Accordingly, the seals 400, 402 make an air-tight seal between the rod 318 and the hollow sleeve 320. In this way, rod 318 and the hollow sleeve 320 form a pneumatic shock absorber. The air in the hollow sleeve 320 is trapped by the seals 400, 402 and creates a piston.

The hollow sleeve comprises a valve 408 for selectively controlling the airflow out and in of the hollow sleeve 320. In some embodiments, the valve 408 is a ball valve 410 which allows air to freely escape from the hollow sleeve 320 when the rod 318 is compressed into the hollow sleeve 320. When the rod 318 is pulled out of the hollow sleeve 320, the ball valve 410 limits the rate that air can re-enter the hollow sleeve 320. In alternative embodiments, the valve can be a rubber flap 706 (as shown in FIG. 7) which rests over an air hole 710 connected to the interior of the hollow sleeve 320. The rubber flap 706 flexes away from the hollow sleeve 320 when air exits the hollow sleeve 320. When the rod 318 extends from the hollow sleeve 320, the rubber flap 706 covers the air hole and slowly lets air enter the hollow sleeve 320. This means that the threshold force required to extend the rod 318 with respect to the hollow sleeve 320 is greater than the threshold force required compress the rod 318 into the hollow sleeve 320.

In some embodiments the threshold force required to compress the rod 318 into hollow sleeve 320 is approximately 1N. In some embodiments, there is a minimum threshold force required to be exerted on the suction cup 302 before the rod 318 will slide into the hollow sleeve 320. This means that the slidable coupling 316 does not compress if the Z-axis servo 116 rapidly moves the gripper assembly 132. In this way, the minimum threshold force required to compress the slidable coupling 316 is greater than the force experienced by the gripper assembly 132 when the Z-axis servo moves the gripper assembly at the maximum acceleration.

In some embodiments, the threshold force required to extend the rod 318 out of the hollow sleeve 320 is approximately 10N-50N. This means that the gripper assembly 132 will slowly slide away from the Z-axis servo 116 as the slidable coupling 316 extends under the force of gravity. This difference in forces required to cause the sliding movement of the slidable coupling 316 means that the slidable coupling 316 will compress easily when engaging with and object to be picked 106a, 106b.

This means that objects experience minimum crushing force when the gripper assembly 132 descends on them in the Z-axis, and there will be a lifting force immediately when the gripper assembly 132 starts to move upwards in the Z-axis. If there was no dampening provided by the slidable coupling 316 then there will be no lifting force until slidable coupling 316 hits the end stop, at which point the full force is immediately exerted to the object. This could lead to a picked object 106c, falling off the suction gripper 132.

The "shock absorber" functionality brought about by the ball valve 410 can be optionally achieved with other components. For example the first part 318 and the second part 320 can be coupled together with an air cylinder, a silicone oil shock absorber, a rubber dampener, and/or a compression spring. The slidable coupling extends softly due to the dampening effect and there will not be a jerky movement that can dislodge the picked object 106a, 106b from the suction gripper 132.

As mentioned previously, the slidable coupling 316 is a dampener for absorbing shocks and forces that the gripper assembly 132 experiences. in some embodiments, the gripper assembly 132 can be mounted to a separate damper (not shown) in addition to the slidable coupling 316. In this way, the dampening functionality can be carried out by the additional damper component. At the same time, the sliding functionality is still provided by the slidable coupling 316. In some embodiments the damper is a pneumatic damper. The damper can be mounted to the slidable coupling 316. In other embodiments, a separate pneumatic actuator can be used to provide the damping functionality.

FIG. 5 shows another embodiment of the slidable coupling 316. FIG. 5 shows a cross-sectional side view of the gripper assembly 132. The gripper assembly 132 is the same as the embodiments described in reference to FIG. 4 except that the slidable coupling 316 has a different structure.

The first part 318 is slidably coupled to the second part 320 by virtue of a plurality of wheels 500. In some embodiments, there are a plurality of sets of wheels 502, 504 arranged to engage the exterior surface 406 rod 318 at a plurality of locations along the rod 318. Each set 502, 504 of wheels 500, comprises a plurality of wheels to keep the rod 318 aligned along the longitudinal axis of the hollow sleeve 320. The wheels 500 as shown protrude slightly through the hollow sleeve 320. However, in other embodiments the wheels 500 can be mounted within the hollow sleeve 320 between the rod 318 and the interior surface 404 of the hollow sleeve 320. The bearings of the wheels 500 are not shown for the purposes of clarity. However, the bearings of the wheels 500 are coupled to the hollow sleeve 320 to fix the rotation of axis of the wheels with respect to the hollow sleeve 320. In other embodiments, the bearing of the wheels 500 are coupled to the rod 318.

In some embodiments, the wheels 500 have an increased frictional force in one direction of rotation e.g. clockwise when compared to the other direction of rotation e.g. counterclockwise. In this way, the difference in the forces required to rotate the wheels means that different forces are required to extend the rod 318 out of the hollow sleeve 320 and compress the rod 318 into the hollow sleeve 320.

Figure 5D:
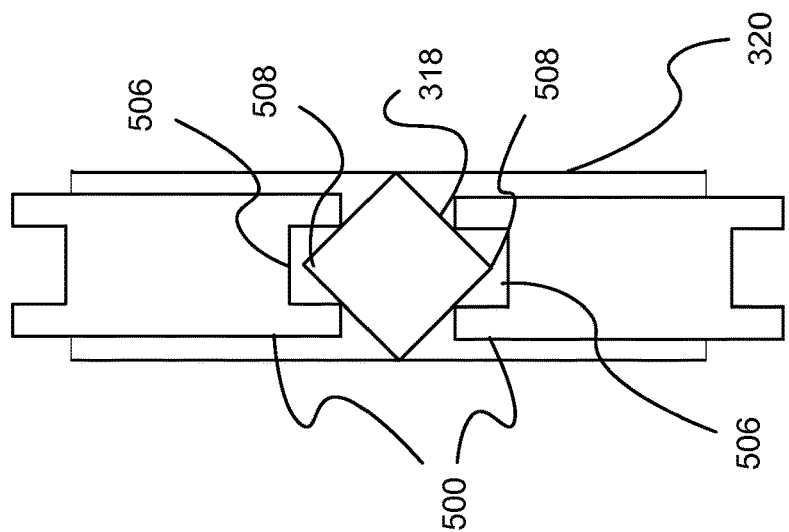
FIG. 5d shows a cross-section view through another gripper assembly.
Figure 5B:
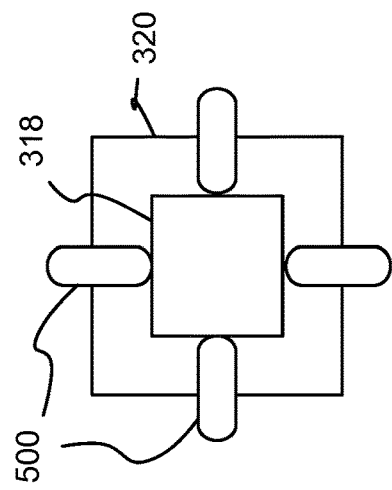
Figure 5C:
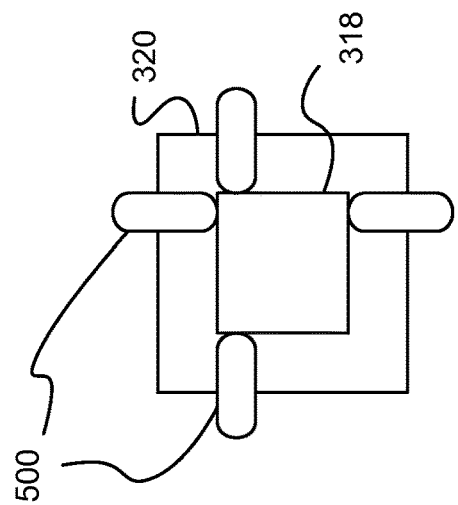
FIG. 5c shows a cross-section view through another gripper assembly.
Figure 5A:
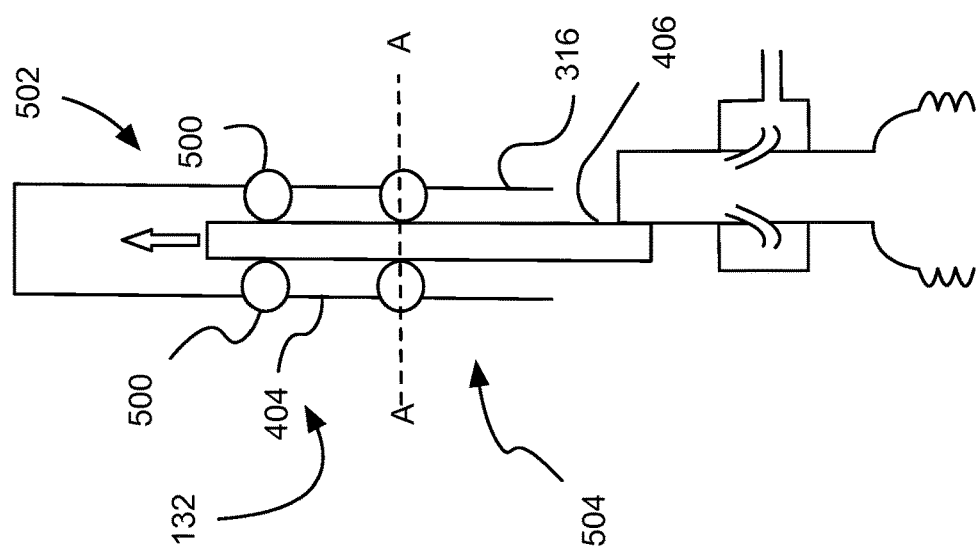
FIG. 5a shows a schematic cross-sectional view of another gripper assembly.

FIG. 5b and FIG. 5c show a cross sectional plan view of the slidable coupling 316 along the axis A-A. The wheels 500 engage the rod 318 along the external surface of the rod 318. In some embodiments, there are four wheels 500 which engage each face of the square rod 318. In some embodiments, the cross-sectional shape of the rod 318 is another shape such as triangular, hexagonal or any other shape. FIG. 5d shows another cross sectional plan view of the slidable coupling 316. In this case the wheels comprise a groove 506 for receiving a corner 508 of the rod 318.

Turning to FIG. 6, another embodiment will be described. FIG. 6 shows a gripper assembly 132 which is similar to the gripper assembly 132 as described in reference to FIGS. 3, 4 and 5a, 5b, 5c, 5d. The gripper assembly 132 comprises at least one sensor 600 for determining when the gripper assembly 132 has engaged the object to be picked 106a, 106b. In some embodiments, the at least one sensor 600 is the Z-axis servo 116. In this case, the Z-axis servo 116 provides measurement data as to the current and voltage being used by the Z-axis servo 116. As the Z-axis servo 116 moves the gripper assembly 132 down towards the working area 108, the Z-axis servo 116 will have a particular voltage and/or current profile. When the gripper assembly 132 engages with the object to be picked, the slidable coupling 316 starts moving. Accordingly, the gripper assembly 132 decelerates as the slidable coupling 316 absorbs the kinetic energy of the downwardly descending gripper assembly 132. As the gripper assembly 132 decelerates, the current and/or voltage profile of the Z-axis servo 116 changes. The controller 102 detects the changes in the voltage and/or current. At this point, the controller 102 determines that the gripper assembly 132 is in contact with an object to be picked and the Z-axis servo 116 should stop.

In some other embodiments, the at least one sensor 600 can be another sensor 602 for detecting movement of the gripper assembly 132 and/or engagement of the gripper assembly 132 and the object to be picked. For example, the at least one sensor can be an accelerometer mounted on the suction cup 302. Alternatively, the sensor 602 can be a camera for detecting contact between the suction cup 302 and the object to be picked.

The Z-axis servo 116 and controller 102 have a latency when bringing the Z-axis servo to a stop. Advantageously the slidable coupling 316 can absorb the downward movement of the gripper assembly 132 in the time period between the gripper assembly 132 first touching the object to be picked and the Z-axis servo 116 stopping.

Advantageously, the slidable coupling 316 between the gripper assembly 132 and the Z-axis servo 116 provides a z-axis feedback of the gripper assembly 132 height above objects to be picked and/or the conveyor belt 110. Accordingly, less computational processing for the manipulator needs to be made with respect to the Z-axis dimension because the mechanical arrangement of the slidably mounted gripper assembly 132 means that there will always be engagement of the suction cup 302 on the surface of the object 106a, 106b without damaging the gripper assembly 132.

Accordingly, this means that the object identification by the controller 102 needs only occur in the plane of the conveyor belt 110 and the working area 108. The controller 102 assumes that all the objects 106a, 106b are in the plane of the conveyor belt 110 and every pick is conducted at the conveyor belt 110 level. The slidably mounted gripper assembly 132 means that the controller 102 does not need to compute how high the objects 106a, 106b are in the Z-axis. This means the software can be simpler and less computational processing is required. In turn, this means that there is less latency in making picks and the throughput of the waste sorting robot 100 is higher.

Another embodiment will now be described with reference to FIG. 7. FIG. 7 is a schematic front view of the gripper assembly 132 and manipulator 104. The embodiment as shown in FIG. 7 is similar to the previously described embodiments except that the slidable coupling comprises a first slidable coupling 700 and a second slidable coupling 702. The functionality of the first and second slidable couplings 700, 702 is the same as the slidable coupling 316 described in reference to the previous embodiments. Having two slidable couplings 700, 702 means that there is no offset between the slidable couplings 700, 702 and the suction cup 302. The suction gripper assembly 132 is mounted on a plate 708 connected between the slidable coupling 700, 702. This means that the gripper assembly 132 is more securely mounted to the manipulator 104.

In some embodiments, the gripper assembly 132 comprises one or more bearings (not shown). The bearings are made from a low friction suitable material e.g. polyoxymethylene (POM plastic) rings. The bearings are mounted on the second part of the slidable coupling 700, 702, and the bearings slide against the aluminium of the first part 700, 702. In other embodiments the bearings can be mounted on the first part instead. In contrast to the embodiments using wheels described previously, the embodiments show in FIG. 7 mean that the engagement between the first part and the second part of the slidable coupling does not have any moving parts. This means that the slidable coupling 700, 702 only moves when an object is being picked, and the manipulator 104 is moving slowly. When the manipulator 104 is moving fast, the slidable coupling 700, 702 is typically not moving. In some embodiments, the total slide distance of the slidable couplings 700, 702 is 15 cm. In some embodiments the slide distance can be varied as required.

The slidably mounted gripper assembly 132 can be used in conjunction with a waste sorting gantry robot or other types of waste sorting robots such as delta robots or robot arms. In other embodiments, the slidably mounted gripper assembly 132 as described with respect to the FIGS. 1 to 6 can also be used with other types of sorting robot which are not waste sorting robots. For example, the slidably mounted suction gripper 132 can be used with industrial robots in the automotive industry, food industry etc.

Turning to FIGS. 8 and 9, other embodiments will now be described in further detail. FIGS. 8 and 9 show a schematic front view of the gripper assembly 132 and manipulator 104. The arrangement in FIGS. 8 and 9 is the same as the embodiments described in reference to the FIGS. 1 to 7. However, manipulator 104 as shown in FIGS. 8 and 9 does not have a Z-axis servo. Instead, the Z-axis servo is replaced with an actuator 800 which is coupled to the slidable coupling 802. The actuator 800 is arranged to extend or retract and move the gripper assembly 132 towards or away from the working area 108.

Similar to the previously described embodiments, the slidable coupling 802 comprises a first part 804 coupled to the gripper assembly 132 and a second part 806 which is coupled to the manipulator carriage 130 or Y-axis servo 114.

The longitudinal axis C-C of the slidable coupling 802 is aligned with the longitudinal axis of the gripper assembly 132. This means that when the gripper assembly 132 engages an object 106a, 106b, 106c, the downwards force resulting from the actuator 800 is substantially in line with point of contact of the suction cup 400 with the object 106a, 106b, 106c. This means that the chance of producing a turning moment on the object 106a, 106b, 106c during a picking operation is reduced and this increases the picking success.

In some embodiments, the actuator 800 is a pneumatic piston 800 which is coupled to the previously described pneumatic system 220. The pneumatic system 220 comprises at least one first hose 222 for connecting the suction gripper 132 to the pneumatic system 220 and at least one second hose 816 for connecting the pneumatic piston 800 to the pneumatic system 220. The control of the pneumatic piston 800 is similar to the previously discussed pneumatic system 220. Whilst FIG. 8 shows the pneumatic piston 800 is coupled to the same pneumatic system 200, in other embodiments, the pneumatic piston 800 can be coupled to a separate pneumatic system (not shown).

As shown in FIG. 8, the moveable head 810 of the pneumatic piston 800 is fixed to the second part 806 of the slidable coupling 802 and the body 812 of the pneumatic piston 800 is fixed to the first part 804 of the slidable coupling 804. When the pneumatic piston 800 is actuated, the moveable head 810 extends away from the body 812 of the pneumatic piston 800. In this way, when the pneumatic piston 800 extends, the first part 804 and the second part 806 of the slidable coupling 802 move away from each other.

As shown in FIG. 8, the first part 804 is a hollow sleeve 804 arranged to slide over the second part 806 which is an inner rod. This is similar to the previously described embodiments. Indeed, the slidable coupling 802 can optionally have one or more features of the structure as previously described in reference to FIGS. 1 to 7.

During operation, the previously described dampening effect can be achieved and allowing the first part 804 and the second part 806 to slide towards each other as the gripper assembly 132 engages an object 106a, 106b, 106c in the working area 108. Optionally, the pneumatic piston 800 is not connected to the compressed air supply of the pneumatic system 200 as the gripper assembly 132 engages the object 106a, 106b, 106c. Alternatively, the air in the pneumatic piston 800 is allowed to escape to the atmosphere. In this case, the operation of the pneumatic piston 800 is similar to the functionality of the slidable coupling 316 as shown in FIGS. 4 to 6.

In an alternative embodiment, the dampening effect can be achieved by actively retracting the pneumatic piston 800 as the suction gripper assembly engages the object 106a, 106b, 106c. Advantageously this means the force of the impact between the suction cup 400 and the object can be dampened and the speed of the pick can be increased. This is because the pneumatic piston 800 retracts for dampening the force and then can continue to retract to lift the gripped object 106a, 106b, 106c in the Z-axis direction. This means that the pneumatic piston 800 is already moving away from the working area 108 and the pneumatic piston 800 does not have to change direction. In other words the pneumatic piston 800 has a dual functionality of the Z-axis actuator and a shock absorber during the picking operation.

In some embodiments, the pneumatic piston 800 comprises at least one piston sensor 814. The piston sensor 814 detects movement, acceleration and or position of the moveable head 810 with respect to the body 812 of the pneumatic piston 800. In some embodiments, the piston sensor 814 is one or more of the following sensors: a reed switch, a hall sensor, an anisotropic magnetoresistive sensor, a giant magnetoresistive sensor, or any other suitable detector for determining the status of the pneumatic piston 800 e.g. the position of the moveable head 810 with respect to the body 812.

The piston sensor 814 is connected to the controller 102 similarly to the other previously described sensors 600, 602 with respect to the embodiments shown in FIGS. 1 to 7. Accordingly, the controller 102 can control the position of the suction gripper assembly 132 in dependence on a signal received from the piston sensor 814. The control of the servos, 112, 114 and the pneumatic piston 800 to pick objects 106a, 106b, 106c is similar to the previously described control functionality described in respect of FIGS. 1 to 7.

In other embodiments, the actuator 800 is not a pneumatic piston, but is a mechanical linkage. The actuator 800 can be any suitable mechanism for extending the slidable coupling 802 towards the working area 108.

Another embodiment will now be described in reference to FIG. 9. FIG. 9 is the same as the arrangement as shown in FIG. 8 except that the slidable coupling 900 has been modified.

The pneumatic piston 800 itself forms part of the slidable coupling 900. In particular, the body 812 of the pneumatic piston 800 is inserted and fixed within the hollow sleeve of the first part 902. In this way, the body 812 of the pneumatic piston 800 forms a portion of the first part 902 of the slidable coupling 900. The moveable head 810 is fixed to the manipulator carriage 130 or the Y-axis servo 114. In this way, the moveable head 810 of the pneumatic piston 800 forms a portion of the second part 904 of the slidable coupling 900. This means that the moveable head 810 and the body 812 of the pneumatic piston 800 slide with respect to each other when the pneumatic piston 800 is extended or retracted.

In another embodiment two or more embodiments are combined. Features of one embodiment can be combined with features of other embodiments.

Embodiments of the present invention have been discussed with particular reference to the examples illustrated. However it will be appreciated that variations and modifications may be made to the examples described within the scope of the invention.

The invention claimed is:

1. A waste sorting manipulator comprising:
   a gripper assembly configured to interact with one or more waste objects to be sorted within a working area;
   at least one servo configured to move the gripper assembly with respect to the working area; and
   at least one slidable coupling mounted between the at least one servo and the gripper assembly to allow relative movement between the at least one servo and the gripper assembly, the at least one slidable coupling comprising a two-way valve;
   wherein the gripper assembly is a suction gripper assembly including a deformable suction cup that is configured to engage the one or more waste objects to be sorted; and
   wherein the two-way valve is configured to allow air to escape from the at least one slidable coupling at a first rate and enter the at least one slidable coupling at a second rate that is less than the first rate.

2. A waste sorting manipulator according to claim 1 wherein the at least one servo is a servo configured to vary the height of the gripper assembly above the working area.

3. A waste sorting manipulator according to claim 1 wherein the at least one servo moves the gripper assembly in a direction normal to the plane of the working area.

4. A waste sorting manipulator according to claim 1 wherein the gripper assembly slides relative to the at least one servo in a direction normal to the plane of the working area.

5. A waste sorting manipulator according to claim 1 wherein the at least one slidable coupling compresses when the gripper assembly receives a force in a direction towards the at least one servo which is above a compression force threshold.

6. A waste sorting manipulator according to claim 5 wherein the at least one slidable coupling extends when the gripper assembly receives a force in a direction away from the at least one servo which is above an extension force threshold.

7. A waste sorting manipulator according to claim 6, wherein the compression force threshold is less than the extension force threshold.

8. A waste sorting manipulator according to claim 6 wherein the rate of compression of the at least one slidable coupling is greater than the rate of extension of the at least one slidable coupling.

9. A waste sorting manipulator according to claim 1 wherein the at least one slidable coupling comprises a first part coupled to the gripper assembly and a second part coupled to the at least one servo.

10. A waste sorting manipulator according to claim 9 wherein the first part and the second part are configured to slide relative to each other over a distance of 10 cm to 50 cm.

11. A waste sorting manipulator according to claim 9 wherein the first part is a rod and the second part is a hollow sleeve configured to receive the rod.

12. A waste sorting manipulator according to claim 11 wherein there is a seal between the first part and the second part.

13. A waste sorting manipulator according to claim 12, wherein the two-way valve is configured to allow air to escape from the hollow sleeve when the at least one slidable coupling is compressed.

14. A waste sorting manipulator according to claim 1 wherein an actuator is arranged to move the gripper assembly towards the working area and the actuator is coupled to the at least one slidable coupling.

15. A waste sorting manipulator according to claim 14 wherein the at least one slidable coupling comprises a portion of the actuator.

16. A waste sorting manipulator according to claim 14 wherein the actuator is coupled between the at least one slidable coupling and the at least one servo.

17. A waste sorting manipulator according to claim 14 wherein the actuator is a pneumatic actuator.

18. A waste sorting manipulator according to claim 14 wherein the actuator and the gripper assembly are substantially aligned along the same longitudinal axis.

19. A waste sorting manipulator according to claim 1 wherein the waste sorting manipulator comprises at least one sensor configured to determine that the gripper assembly has engaged an object.

20. A waste sorting manipulator according to claim 19 wherein the at least one sensor is configured to detect changes in acceleration, velocity or position of the gripper assembly.

21. A waste sorting robot comprising:
a frame; and
a waste sorting manipulator according to claim 1 wherein the waste sorting manipulator is moveably mounted on the frame and the waste sorting manipulator is moveable within the working area.

22. A waste sorting robot according to claim 21 wherein the waste sorting robot is a waste sorting gantry robot and the frame is a gantry frame.

23. A waste sorting manipulator comprising:
a gripper assembly configured to interact with one or more waste objects to be sorted within a working area;
at least one servo configured to move the gripper assembly with respect to the working area;
a rack and pinion assembly operatively coupled to the at least one servo; and
at least one slidable coupling mounted between the rack and pinion assembly and the gripper assembly to allow relative movement between the at least one servo and the gripper assembly;
wherein the at least one slidable coupling comprises a hollow sleeve coupled to the rack and pinion assembly and a rod coupled to the gripper assembly and configured to be received within the hollow sleeve.

* * * * *